(12) United States Patent
Mizuno et al.

(10) Patent No.: US 10,850,636 B2
(45) Date of Patent: Dec. 1, 2020

(54) DRIVE DEVICE, VEHICLE, AND CONTROL METHOD FOR DRIVE DEVICE

(71) Applicant: DENSO CORPORATION, Aichi-pref (JP)

(72) Inventors: Masashi Mizuno, Toyota (JP); Toshihiro Yamamoto, Toyohashi (JP); Kenji Yamada, Komaki (JP)

(73) Assignee: DENSO CORPORATION, Kariya (JP)

( * ) Notice: Subject to any disclaimer, the term of this patent is extended or adjusted under 35 U.S.C. 154(b) by 386 days.

(21) Appl. No.: 15/816,411

(22) Filed: Nov. 17, 2017

(65) Prior Publication Data

US 2018/0162379 A1 Jun. 14, 2018

(30) Foreign Application Priority Data

Dec. 9, 2016 (JP) .................................. 2016-239424

(51) Int. Cl.
*B60L 58/12* (2019.01)
*B60W 20/40* (2016.01)
(Continued)

(52) U.S. Cl.
CPC ................ *B60L 58/12* (2019.02); *B60K 6/44* (2013.01); *B60K 6/445* (2013.01); *B60L 1/02* (2013.01); *B60L 7/14* (2013.01); *B60L 15/2045* (2013.01); *B60L 50/10* (2019.02); *B60L 50/16* (2019.02); *B60W 10/08* (2013.01); *B60W 20/13* (2016.01); *B60W 20/15* (2016.01); *B60W 20/40* (2013.01);
(Continued)

(58) Field of Classification Search
CPC .. B60L 1/003; B60L 58/26; B60L 1/02; B60L 2240/36; B60L 50/16; B60L 58/12; B60W 20/00; B60W 10/06; B60W 10/26; B60W 20/12; B60W 20/13; B60W 20/15; B60W 20/40; B60W 30/18
See application file for complete search history.

(56) References Cited

U.S. PATENT DOCUMENTS 7,698,048 B2 * 4/2010 Jung ..................... B60W 20/10
    701/103
8,195,370 B2 * 6/2012 Simon, Jr. ........... F02D 41/1497
    701/54
(Continued)

FOREIGN PATENT DOCUMENTS

JP      5-129087 A      5/1993
JP      7-147705 A      6/1995
(Continued)

*Primary Examiner* — Hunter B Lonsberry
*Assistant Examiner* — Luis A Martinez Borrero
(74) *Attorney, Agent, or Firm* — Sughrue Mion, PLLC

(57) ABSTRACT

An electronic control unit is configured to generate a pulse width modulation signal of a plurality of switching elements based on a modulation factor and a voltage phase of a voltage based on a torque command of a motor and a pulse number per unit cycle of an electric angle of the motor and perform switching of the switching elements. The electronic control unit is configured to generate the pulse width modulation signal of the switching elements such that total loss of the motor and an inverter when a heat conversion request of drive electric power of the motor has been issued becomes greater than the total loss when the heat conversion request has not been issued.

8 Claims, 10 Drawing Sheets

(51) Int. Cl.

| | | |
|---|---|---|
| *B60W 10/08* | (2006.01) | |
| *B60W 30/18* | (2012.01) | |
| *B60W 50/00* | (2006.01) | |
| *B60W 20/15* | (2016.01) | |
| *B60L 15/20* | (2006.01) | |
| *B60L 1/02* | (2006.01) | |
| *B60L 7/14* | (2006.01) | |
| *B60L 50/10* | (2019.01) | |
| *B60W 20/13* | (2016.01) | |
| *B60L 50/16* | (2019.01) | |
| *B60W 20/00* | (2016.01) | |
| *B60K 6/44* | (2007.10) | |
| *B60K 6/445* | (2007.10) | |
| *H02M 7/5395* | (2006.01) | |
| *H02P 27/08* | (2006.01) | |
| *H02M 1/32* | (2007.01) | |
| *H02M 1/00* | (2006.01) | |

(52) U.S. Cl.
CPC ...... *B60W 30/18127* (2013.01); *B60W 50/00* (2013.01); *H02M 7/5395* (2013.01); *B60L 2220/42* (2013.01); *B60L 2240/423* (2013.01); *B60L 2240/443* (2013.01); *B60W 20/00* (2013.01); *B60W 2050/0058* (2013.01); *B60W 2510/246* (2013.01); *B60W 2520/26* (2013.01); *B60W 2552/15* (2020.02); *B60Y 2200/92* (2013.01); *H02M 2001/0048* (2013.01); *H02M 2001/327* (2013.01); *H02P 27/08* (2013.01); *Y02T 10/6239* (2013.01); *Y02T 10/644* (2013.01); *Y02T 10/645* (2013.01); *Y02T 10/646* (2013.01); *Y02T 10/70* (2013.01); *Y02T 10/7005* (2013.01); *Y02T 10/705* (2013.01); *Y02T 10/7044* (2013.01); *Y02T 10/7077* (2013.01); *Y02T 10/72* (2013.01); *Y02T 10/7283* (2013.01); *Y02T 10/92* (2013.01); *Y10S 903/903* (2013.01)

(56) References Cited

U.S. PATENT DOCUMENTS

| | | | | |
|---|---|---|---|---|
| 8,344,680 | B2* | 1/2013 | Kitanaka | H02P 27/04 318/632 |
| 8,890,597 | B2* | 11/2014 | Huang | H02M 11/00 327/306 |
| 9,088,234 | B2* | 7/2015 | Suzuki | H02P 6/14 |
| 9,550,434 | B2* | 1/2017 | King | B60L 58/20 |
| 9,673,747 | B2* | 6/2017 | Nakamura | B62D 5/046 |
| 9,806,653 | B2* | 10/2017 | Morii | H02P 27/085 |
| 9,837,948 | B2* | 12/2017 | Kazuno | H02P 6/14 |
| 9,887,663 | B2* | 2/2018 | Kitaori | B60L 3/0046 |
| 10,081,255 | B2* | 9/2018 | Yamada | H02M 1/32 |
| 10,081,256 | B2* | 9/2018 | Yamada | B60L 50/51 |
| 10,093,199 | B2* | 10/2018 | Yamamoto | H02P 27/08 |
| 10,232,719 | B2* | 3/2019 | Tajima | B60L 50/51 |
| 10,447,172 | B2* | 10/2019 | Hayashi | H02P 11/06 |
| 2007/0267926 | A1* | 11/2007 | Hauenstein | B60L 15/20 310/64 |
| 2007/0278986 | A1* | 12/2007 | Okamura | B60K 6/365 318/798 |
| 2009/0024263 | A1* | 1/2009 | Simon, Jr. | F02D 41/1497 701/22 |
| 2009/0037073 | A1* | 2/2009 | Jung | F02D 41/102 701/101 |
| 2009/0108588 | A1* | 4/2009 | Yuri | F02G 5/04 290/1 A |
| 2010/0100266 | A1* | 4/2010 | Yoshinori | H01M 8/04007 701/22 |
| 2010/0138090 | A1* | 6/2010 | Jinno | B60L 50/16 701/22 |
| 2011/0025240 | A1* | 2/2011 | Furukawa | H02P 6/085 318/400.3 |
| 2011/0086280 | A1* | 4/2011 | Roustaei | C25B 1/04 429/422 |
| 2012/0153718 | A1* | 6/2012 | Rawlinson | B60L 53/14 307/10.1 |
| 2012/0247753 | A1* | 10/2012 | Bachmann | B60H 1/00278 165/287 |
| 2013/0079963 | A1* | 3/2013 | Shono | H02K 9/19 701/22 |
| 2013/0200830 | A1* | 8/2013 | Suzuki | H02M 1/12 318/400.27 |
| 2013/0283835 | A1* | 10/2013 | Katoh | B60H 1/00342 62/180 |
| 2013/0298588 | A1* | 11/2013 | Jojima | B60L 3/003 62/259.2 |
| 2014/0159794 | A1* | 6/2014 | Huang | H02M 11/00 327/306 |
| 2015/0000327 | A1* | 1/2015 | Kakehashi | H01M 10/625 62/434 |
| 2015/0244301 | A1* | 8/2015 | Sato | B60L 58/12 318/139 |
| 2015/0258900 | A1* | 9/2015 | Morii | B60L 7/14 290/16 |
| 2015/0273976 | A1* | 10/2015 | Enomoto | B60L 50/15 165/202 |
| 2015/0303819 | A1* | 10/2015 | Qu | H02M 7/487 363/35 |
| 2016/0031291 | A1* | 2/2016 | Enomoto | B60K 11/02 62/179 |
| 2016/0043670 | A1* | 2/2016 | Nakamura | H02P 29/032 318/400.17 |
| 2016/0129796 | A1* | 5/2016 | Tomura | H02J 7/1423 701/22 |
| 2016/0153343 | A1* | 6/2016 | Kakehashi | B60H 1/00885 123/41.31 |
| 2016/0159204 | A1* | 6/2016 | Katoh | B60H 1/32284 62/185 |
| 2016/0185249 | A1* | 6/2016 | King | B60L 58/20 318/139 |
| 2016/0190971 | A1* | 6/2016 | Yamakawa | H02P 27/08 318/504 |
| 2016/0308475 | A1* | 10/2016 | Morii | H02P 21/02 |
| 2017/0106761 | A1* | 4/2017 | Tajima | H02J 7/0045 |
| 2017/0175612 | A1* | 6/2017 | Tokozakura | F01P 7/14 |
| 2017/0257055 | A1* | 9/2017 | Kitaori | B60L 3/0061 |
| 2017/0264228 | A1* | 9/2017 | Kazuno | H02M 3/156 |
| 2018/0264913 | A1* | 9/2018 | Enomoto | F01P 7/161 |
| 2018/0339583 | A1* | 11/2018 | Hirai | H02K 5/20 |
| 2019/0016232 | A1* | 1/2019 | Kim | H01M 10/425 |

FOREIGN PATENT DOCUMENTS

| | | |
|---|---|---|
| JP | 7-212912 A | 8/1995 |
| JP | 2011-020629 A | 2/2011 |
| JP | 2013-162660 A | 8/2013 |
| JP | 5594301 B2 | 8/2014 |
| JP | 2015-053824 A | 3/2015 |
| JP | 2015-156755 A | 8/2015 |
| JP | 2017-200379 A | 11/2017 |
| WO | 2015/125586 A1 | 8/2015 |

* cited by examiner

DRIVE DEVICE, VEHICLE, AND CONTROL
METHOD FOR DRIVE DEVICE

INCORPORATION BY REFERENCE

The disclosure of Japanese Patent Application No. 2016-239424 filed on Dec. 9, 2016 including the specification, drawings and abstract is incorporated herein by reference in its entirety.

BACKGROUND

1. Technical Field

The present disclosure relates to a drive device, a vehicle and a control method for a drive device, and in particular, to a drive device including a motor, an inverter, and an electric power storage device, a vehicle, and a control method for a drive device.

2. Description of Related Art

As a drive device, a drive device that includes an electric motor, and an electric power conversion device having an inverter circuit configured to drive the electric motor by switching a plurality of switching elements, generates a pulse signal of the switching elements based on a pulse number in one electrical cycle of the electric motor and a modulation factor and a voltage phase of a voltage according to a torque command of the electric motor, and switches the switching elements has been suggested (for example, see Japanese Unexamined Patent Application Publication No. 2013-162660 (JP 2013-162660 A)). In the drive device, the pulse signal is generated such that total electric power loss of the electric power conversion device and the electric motor is minimized based on the pulse number, the modulation factor, and the voltage phase, thereby achieving reduction of total electric power loss.

SUMMARY

In the above-described drive device, since a pulse signal is generated based on the pulse number, the modulation factor, and the voltage phase such that total electric power loss of the electric power conversion device and the electric motor is minimized, there is a possibility that, when there is a heat conversion request of drive electric power of the electric motor, it is not possible to sufficiently cope with the request.

When there is a heat conversion request of drive electric power of a motor (electric motor), a drive device, a vehicle, and a control method for a drive device of the disclosure more sufficiently copes with the request.

A first aspect of the present disclosure is a drive device. The drive device includes a motor, an inverter, an electric power storage device, and an electronic control unit. The inverter is configured to drive the motor by switching a plurality of switching elements. The electric power storage device is connected to the inverter through an electric power line. The electronic control unit is configured to generate a pulse width modulation signal of the switching elements based on a modulation factor and a voltage phase of a voltage and a predetermined pulse number and configured to performs switching of the switching elements. The electronic control unit is configured to generate the pulse width modulation signal of the switching elements such that total loss when a heat conversion request of drive electric power of the motor has been issued becomes greater than total loss when the heat conversion request has not been issued. The modulation factor and the voltage phase of the voltage are based on a torque command of the motor. The predetermined pulse number is a pulse number per unit cycle of an electric angle of the motor. The total loss is total loss of the motor and the inverter.

With the above-described configuration, in generating the pulse width modulation signal of the switching elements based on the modulation factor and the voltage phase of the voltage according to the torque command of the motor and the pulse number per unit cycle of the electric angle of the motor and performing switching of the switching elements, when the heat conversion request of the drive electric power of the motor has been issued, the PWM signal of the switching elements is generated such that the total loss of the motor and the inverter becomes greater than when the heat conversion request has not been issued. With this, when the heat conversion request has been issued, it is possible to increase the total loss to increase the amount of heat generated (amount of heat converted). That is, it is possible to more sufficiently cope with the heat conversion request.

In the drive device, the electronic control unit may be configured to generate the pulse width modulation signal of the switching elements such that the total loss when the heat conversion request has been issued becomes greater than the total loss when the heat conversion request has not been issued in the same pulse number. In general, when the pulse number is made small, the controllability of the motor is deteriorated, and when the pulse number is made large, inverter loss (switching loss) is increased. With the above-described configuration, when the total loss is made large with the same pulse number, it is possible to increase the total loss without causing deterioration of the controllability of the motor or an increase in inverter loss.

In the drive device, the electronic control unit may be configured to generate the pulse width modulation signal of the switching elements such that the total loss when the heat conversion request has been issued, the total loss becomes greater than the total loss when the heat conversion request has not been issued due to a harmonic component of a desired degree becoming greater. With the above-described configuration, it is possible to adjust the total loss by adjusting a harmonic component of a desired degree.

In the drive device, the drive device may further include a cooling device configured to circulate a coolant to the motor, the inverter, and the electric power storage device. The electronic control unit may be configured to determine that the heat conversion request has been issued when a temperature increase request of the electric power storage device has been issued. With the above-described configuration, when the temperature increase request of the electric power storage device has been issued, it is possible to increase the total loss to increase the amount of heat generated (the amount of heat converted). As a result, it is possible to promote an increase in temperature of the coolant, and to promote an increase in temperature of the electric power storage device.

In the drive device, the drive device may further include a cooling device configured to circulate a coolant to an engine, the motor, and the inverter. The electronic control unit may be configured to determine that the heat conversion request has been issued when a warm-up request of the engine has been issued. With the above-described configuration, when the warm-up request of the engine has been issued, it is possible to increase the total loss to increase the amount of heat generated (the amount of heat converted). As a result, it is possible to promote an increase in temperature of the coolant, and to promote the warm-up of the engine.

A second aspect of the present disclosure is a vehicle. The vehicle includes a drive device, an engine, a second motor, a second inverter, a planetary gear, and a capacitor. The drive device includes a first motor, a first inverter, an electric power storage device, and an electronic control unit. The first inverter is configured to drive the first motor by switching a plurality of first switching elements. The electric power storage device is connected to the first inverter through an electric power line. The second inverter is connected to the first motor and the electric power storage device through the electric power line. The second inverter is configured to drive the second motor by switching a plurality of second switching elements. The planetary gear includes three rotating elements connected to the second motor, the engine, and a drive shaft that is coupled to drive wheels, the second motor, the engine, and the drive shaft is arranged in this order in a collinear diagram. The capacitor is attached to the electric power line. The first motor is connected to the drive shaft. The electronic control unit is configured to generate a pulse width modulation signal of the first switching elements based on a modulation factor and a voltage phase of a voltage and a predetermined pulse number and perform switching of the first switching elements. The electronic control unit is configured to generate the pulse width modulation signal of the first switching elements such that first total loss when a first heat conversion request of drive electric power of the first motor has been issued becomes greater than first total loss when the first heat conversion request has not been issued. The electronic control unit is configured to perform switching of the first switching elements of the first inverter and perform switching of the second switching elements of the second inverter. The electronic control unit is configured to determine that the first heat conversion request and a second heat conversion request of drive electric power of the second motor have been issued when the drive wheels are gripped after the drive wheels are slipped. When the electronic control unit determines that there are the heat conversion request and the second heat conversion request, the electronic control unit is configured to generate the pulse width modulation signal of the first switching elements and perform switching of the first switching elements such that the first total loss when the electronic control unit determines that the first heat conversion request and the second heat conversion request have been issued becomes greater than the first total loss when the electronic control unit determines that the first heat conversion request and the second heat conversion request have not been issued, and configured to generate a pulse width modulation signal of the second switching elements and perform switching of the second switching elements such that second total loss when the electronic control unit determines that the first heat conversion request and the second heat conversion request have been issued becomes greater than the second total loss when the electronic control unit determines that the first heat conversion request and the second heat conversion request have not been issued. The modulation factor and the voltage phase of the voltage are based on a torque command of the first motor. The predetermined pulse number is a pulse number per unit cycle of an electric angle of the first motor. The first total loss is total loss of the first motor and the first inverter. The second total loss is total loss of the second motor and the second inverter.

With the vehicle, since the drive device of the disclosure is mounted, it is possible to obtain the effect obtained in the drive device of the disclosure, for example, the same effect as the effect capable of more sufficiently coping with the first heat conversion request. In the vehicle according to the second aspect of the disclosure, when the drive wheels are gripped after the drive wheels are slipped, the electronic control unit determines that the first heat conversion request and the second heat conversion request of the drive electric power of the second motor have been issued, generates the pulse width modulation signal of the first switching elements and performs switching of the first switching elements such that the first total loss becomes greater than the first total loss when the electronic control unit determines that the first heat conversion request and the second heat conversion request have not been issued, and generates the pulse width modulation signal of the second switching elements and performs switching of the second switching elements such that the second total loss of the second motor and the second inverter becomes greater than the second total loss when the electronic control unit determines that the first heat conversion request and the second heat conversion request have not been issued. In a case where the drive wheels are gripped from a state in which the drive wheels are slipped, electric power of the first motor is rapidly decreased by rapidly decreasing a rotation speed of the first motor, and electric power of the second motor is rapidly decreased (is rapidly increased as a value on an electric power generation side). For this reason, the voltage of the electric power line (capacitor) is increased. In the vehicle according to the second aspect of the disclosure, at this time, since determination is made that the first heat conversion request and the second heat conversion request have been issued, and the first total loss and the second total loss are made large, it is possible to suppress a rapid decrease in electric power (including the first total loss) of the first motor and the first inverter and electric power (including the second total loss) of the second motor and the second inverter. As a result, it is possible to suppress an excessive increase in the voltage of the electric power line.

A third aspect of the present disclosure is a vehicle. The vehicle includes a drive device, an engine, a second motor, a second inverter, and a planetary gear. The drive device includes a first motor, a first inverter, an electric power storage device, and an electronic control unit. The first inverter is configured to drive the first motor by switching a plurality of first switching elements. The electric power storage device is connected to the first inverter through an electric power line. The second inverter is connected to the first motor and the electric power storage device through the electric power line. The second inverter is configured to drive the second motor by switching a plurality of second switching elements. The planetary gear includes three rotating elements, the second motor, the engine, and a drive shaft that is coupled to drive wheels, the second motor, the engine, and the drive shaft being arranged in this order in a collinear diagram. The first motor is connected to the drive shaft. The electronic control unit is configured to generate a pulse width modulation signal of the first switching elements based on a modulation factor and a voltage phase of a voltage and a predetermined pulse number and perform switching of the first switching elements. The electronic control unit is configured to generate the pulse width modulation signal of the first switching elements such that total loss when a heat conversion request of drive electric power of the first motor has been issued becomes greater than total loss when the heat conversion request has not been issued. The electronic control unit is configured to perform switching of the first switching elements of the first inverter and perform switching of the second switching elements of the second inverter. The electronic control unit is configured to determine that the heat conversion request has been issued when an output of braking torque to the drive shaft is requested on a downhill road. The electronic control unit is configured to regeneratively drive the first motor by generating the pulse width modulation signal of the first switching elements and performing switching of the first switching elements such that the total loss when the electronic control unit determines that the heat conversion request has been issued becomes greater than the total loss when the electronic control unit determines that the heat conversion request has not been issued. The modulation factor and the voltage phase of the voltage are based on a torque command of the first motor. The predetermined pulse number is a pulse number per unit cycle of an electric angle of the first motor. The total loss is total loss of the first motor and the first inverter.

With the above-described configuration, since the drive device of the disclosure is mounted, it is possible to obtain the effect obtained in the drive device of the disclosure, for example, the same effect as the effect capable of more sufficiently coping with the heat conversion request. In the vehicle according to the third aspect of the disclosure, when the output of the braking torque to the drive shaft is requested on the downhill road, the electronic control unit determines that the heat conversion request has been issued, and execute regeneratively drives the first motor by generating the pulse width modulation signal of the first switching elements and performing switching of the first switching elements such that the total loss becomes greater than the total loss when the electronic control unit determines that the heat conversion request has not been issue. When the output of the braking torque to the drive shaft is requested, basically, in order to improve the energy efficiency of the vehicle, the engine is brought into a state of autonomous operation or operation stop, and the engine and the first motor are controlled such that requested braking torque is output to the drive shaft with the regenerative drive of the first motor. Hereinafter, such control is referred to as "first braking control". However, in a case where a state of charge of a battery becomes equal to or greater than a predetermined ratio, in order to suppress overcharging of the battery, the regenerative drive of the second motor is limited (including being inhibited), and the engine and the second motor are controlled such that the requested braking torque is output to the drive shaft by motoring of the engine performing fuel cut with the second motor. Hereinafter, such control is referred to as "second braking control". On the other hand, on the downhill road, a time for which the output of the braking torque to the drive shaft is requested may be extended to a certain degree. In the vehicle according to the third aspect of the disclosure, when the output of the braking torque to the drive shaft is requested on the downhill road, since determination is made that the heat conversion request has been issued, and the total loss in a case of regeneratively driving the first motor is made large, it is possible to suppress an increase in charging electric power of the battery, and to suppress an increase in the state of charge of the battery to be equal to or greater than the predetermined ratio (to extend the time until the state of charge of the battery becomes equal to or greater than the predetermined ratio). As a result, it is possible to suppress the execution of the second braking control, and to suppress a feeling of racing of the engine given to a driver.

A fourth aspect of the present disclosure is a control method for a drive device. The drive device includes a motor, an inverter, an electric power storage device, and an electronic control unit. The inverter is configured to drive the motor by switching a plurality of switching elements. The electric power storage device is connected to the inverter through an electric power line. The control method includes: generating, the electronic control unit, a pulse width modulation signal of the switching elements based on a modulation factor and a voltage phase of a voltage and a predetermined pulse number and performing switching of the switching elements; and generating, the electronic control unit, the pulse width modulation signal of the switching elements with the electronic control unit such that total loss when a heat conversion request of drive electric power of the motor has been issued becomes greater than total loss when the heat conversion request has not been issued. The modulation factor and the voltage phase of the voltage are based on a torque command of the motor. The predetermined pulse number is a pulse number per unit cycle of an electric angle of the motor. The total loss is total loss of the motor and the inverter.

With the above-described configuration, in generating the pulse width modulation signal of the switching elements based on the modulation factor and the voltage phase of the voltage according to a torque command of the motor and the pulse number per unit cycle of the electric angle of the motor and performing switching of the switching elements, when the heat conversion request of the drive electric power of the motor has been issued, the pulse width modulation signal of the switching elements is generated such that the total loss of the motor and the inverter becomes greater than the total loss when the heat conversion request has not been issued. With this, when the heat conversion request has been issued, it is possible to increase the total loss to increase the amount of heat generated (amount of heat converted). That is, it is possible to more sufficiently cope with the heat conversion request.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Next, a mode for carrying out the disclosure will be described in connection with an example.

Figure 1:
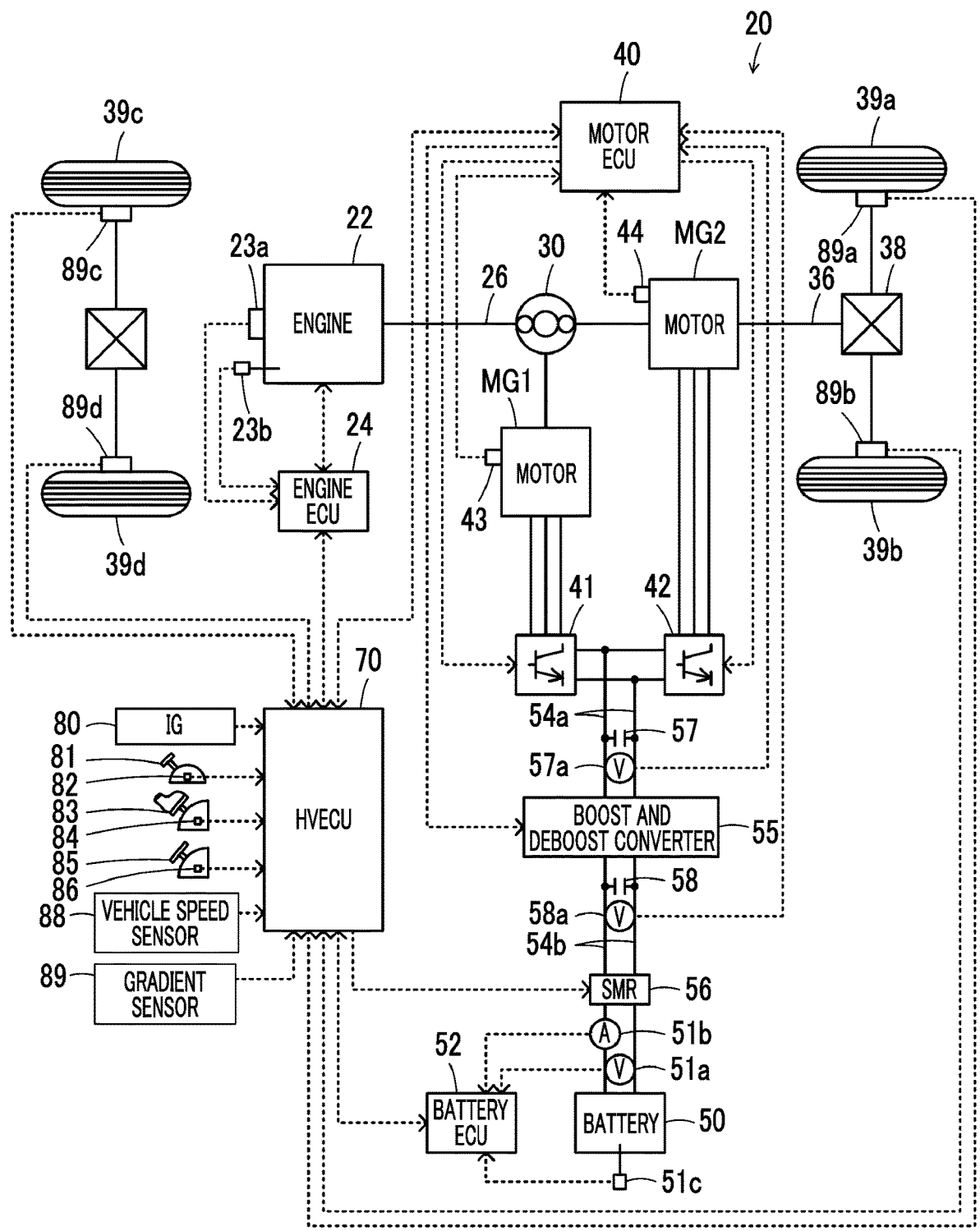
FIG. 1 is a configuration diagram showing the outline of the configuration of a hybrid vehicle in which a drive device of an example of the disclosure is mounted.
Figure 2:
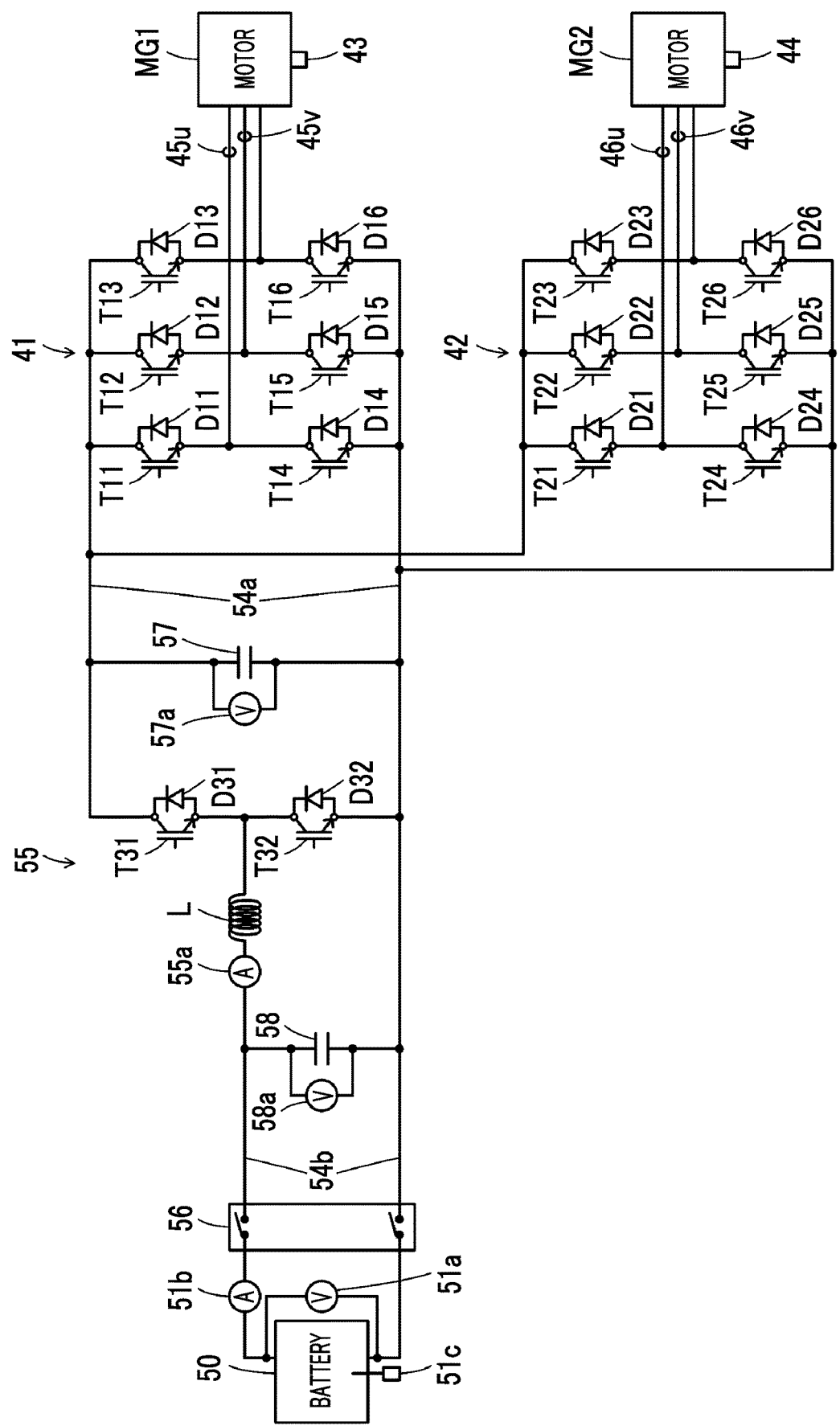
FIG. 2 is a configuration diagram showing the outline of the configuration of an electric drive system including a motor.

FIG. 1 is a configuration diagram showing the outline of the configuration of a hybrid vehicle 20 in which a drive device as an example of the disclosure is mounted. FIG. 2 is a configuration diagram showing the outline of the configuration of an electric drive system including motors MG1, MG2. As shown in FIG. 1, the hybrid vehicle 20 of the example includes an engine 22, a planetary gear 30, motors MG1, MG2, inverters 41, 42, a boost and deboost converter 55, a battery 50 as an electric power storage device, a system main relay 56, and an electronic control unit for hybrid (hereinafter, referred to as an "HVECU") 70.

The engine 22 is constituted as an internal combustion engine that outputs power with gasoline, diesel, or the like as fuel. The engine 22 is operated and controlled by an electronic control unit for an engine (hereinafter, referred to as an "engine ECU") 24.

Though not shown, the engine ECU 24 is constituted as a microprocessor centering on a CPU, and includes, in addition to the CPU, a ROM that stores a processing program, a RAM that temporarily stores data, an input/output port, and a communication port. Signals from various sensors needed for controlling the operation of the engine 22 are input to the engine ECU 24 through the input port. As the signals that are input to the engine ECU 24, for example, a crank angle θcr from a crank position sensor 23a that detects a rotation position of a crankshaft 26 of the engine 22, and a temperature to of the engine 22 from a temperature sensor 23b that detects a temperature of the engine 22 can be exemplified. Various control signals for controlling the operation of the engine 22 are output from the engine ECU 24 through the output port. The engine ECU 24 is connected to the HVECU 70 through the communication port. The engine ECU 24 calculates a rotation speed Ne of the engine 22 based on the crank angle θcr from the crank position sensor 23a.

The planetary gear 30 is constituted as a single-pinion type planetary gear mechanism. A rotor of the motor MG1 is connected to a sun gear of the planetary gear 30. A drive shaft 36 coupled to drive wheels 39a, 39b through a differential gear 38 is connected to a ring gear of the planetary gear 30. The crankshaft 26 of the engine 22 is connected to a carrier of the planetary gear 30.

The motor MG1 is constituted as a synchronous motor generator having a rotor embedded with a permanent magnet and a stator wound with three-phase coils, and as described above, the rotor is connected to the sun gear of the planetary gear 30. Similarly to the motor MG1, the motor MG2 is constituted as a synchronous motor generator, and the rotor is connected to the drive shaft 36.

As shown in FIG. 2, the inverter 41 is connected to a high voltage side electric power line 54a, and has six transistors T11 to T16, and six diodes D11 to D16 connected in reversely parallel with the transistors T11 to T16 in a rectification direction. The transistors T11 to T16 are disposed in pairs so as to become a source side and a sink side with respect to a positive electrode side line and a negative electrode side line of the high voltage side electric power line 54a. The three-phase coils (U-phase, V-phase, and W-phase) of the motor MG1 are connected to connection points between the paired transistors of the transistors T11 to T16, respectively. Accordingly, when a voltage is applied to the inverter 41, the ratio of the on time of the paired transistors of the transistors T11 to T16 is adjusted by an electronic control unit for a motor (hereinafter, referred to as a "motor ECU") 40. With this, a rotating magnetic field is formed in the three-phase coils, and the motor MG1 is rotationally driven. Similarly to the inverter 41, the inverter 42 is connected to the high voltage side electric power line 54a, and has six transistors T21 to T26 and six diodes D21 to D26. Then, when a voltage is applied to the inverter 42, the ratio of the on time of the paired transistors of the transistors T21 to T26 is adjusted by the motor ECU 40. With this, a rotating magnetic field is formed in the three-phase coils, and the motor MG2 is rotationally driven.

The boost and deboost converter 55 is connected to the high voltage side electric power line 54a and a low voltage side electric power line 54b, and has two transistors T31, T32, two diodes D31, D32 connected in reversely parallel with the transistors T31, T32 in a rectification direction, and a reactor L. The transistor T31 is connected to the positive electrode side line of the high voltage side electric power line 54a. The transistor T32 is connected to the transistor T31 and negative electrode side lines of the high voltage side electric power line 54a and the low voltage side electric power line 54b. The reactor L is connected to a connection point between the transistors T31, T32 and a positive electrode side line of the low voltage side electric power line 54b. The ratio of the on time of the transistors T31, T32 is adjusted by the motor ECU 40, whereby the boost and deboost converter 55 boosts electric power of the low voltage side electric power line 54b and supplies electric power to the high voltage side electric power line 54a. The boost and deboost converter 55 deboosts electric power of the high voltage side electric power line 54a and supplies electric power to the low voltage side electric power line 54b. A smoothing capacitor 57 is attached to the positive electrode side line and the negative electrode side line of the high voltage side electric power line 54a. A smoothing capacitor 58 is attached to the positive electrode side line and the negative electrode side line of the low voltage side electric power line 54b.

Though not shown, the motor ECU 40 is constituted as a microprocessor centering on a CPU, and includes, in addition to the CPU, a ROM that stores a processing program, a RAM that temporarily stores data, an input/output port, and a communication port. As shown in FIG. 1, signals from various sensors needed for controlling the drive of the motors MG1, MG2 or the boost and deboost converter 55 are input to the motor ECU 40 through the input port. As the signals that are input to the motor ECU 40, for example, rotation positions θm1, θm2 from rotation position detection sensors 43, 44 that detect rotation positions of the rotors of the motors MG1, MG2, and phase currents Iu1, Iv1, Iu2, Iv2 from current sensors that detect currents flowing in the phases of the motors MG1, MG2 can be exemplified. In addition, a voltage VH of the high voltage side electric power line 54a (the capacitor 57) from a voltage sensor 57a attached between the terminals of the capacitor 57, a voltage VL of the low voltage side electric power line 54b (the capacitor 58) from a voltage sensor 58a attached between the terminals of the capacitor 58, and a current IL flowing in the reactor L from a current sensor attached to a terminal of the reactor L can be exemplified. Various control signals for controlling the drive of the motors MG1, MG2 or the boost and deboost converter 55 are output from the motor ECU 40 through the output port. As the signals that are output from the motor ECU 40, a switching control signal to the transistors T11 to T16, T21 to T26 of the inverters 41, 42, a switching control signal to the transistors T31, T32 of the boost and deboost converter 55, and the like can be exemplified. The motor ECU 40 is connected to the HVECU 70 through the communication port. The motor ECU 40 calculates electric angles θe1, θe2 and rotation speeds Nm1, Nm2 of the motors MG1, MG2 based on the rotation positions θm1, θm2 of the rotors of the motors MG1, MG2 from the rotation position detection sensors 43, 44.

The battery 50 is constituted as, for example, a lithium-ion secondary battery or a nickel-hydrogen secondary battery, and is connected to the low voltage side electric power line 54b. The battery 50 is managed by an electronic control unit for a battery (hereinafter, referred to as a "battery ECU") 52.

Though not shown, the battery ECU 52 is constituted as a microprocessor centering on a CPU, and includes, in addition to the CPU, a ROM that stores a processing program, a RAM that temporarily stores data, an input/output port, and a communication port. Signals from various sensors needed for managing the battery 50 are input to the battery ECU 52 through the input port. As the signals that are input to the battery ECU 52, for example, a voltage Vb of the battery 50 from a voltage sensor 51a provided between the terminals of the battery 50, a current Ib of the battery 50 from a current sensor 51b attached to the output terminal of the battery 50, and a temperature tb of the battery 50 from a temperature sensor 51c attached to the battery 50 can be exemplified. The battery ECU 52 is connected to the HVECU 70 through the communication port. The battery ECU 52 calculates a state of charge SOC based on an integrated value of the current Ib of the battery 50 from the current sensor 51b or calculates input and output limits Win, Wout based on the calculated state of charge SOC and the temperature tb of the battery 50 from the temperature sensor 51c. The state of charge SOC is a ratio of capacity of electric power dischargeable from the battery 50 to the total capacity of the battery 50. The input and output limits Win, Wout are allowable charging and discharging electric power in charging and discharging the battery 50.

The system main relay 56 is provided on the battery 50 side from the capacitor 58 in the low voltage side electric power line 54b. The system main relay 56 is controlled to be turned on and off by the HVECU 70, thereby performing connection and disconnection of the battery 50 and the boost and deboost converter 55.

Though not shown, the HVECU 70 is constituted as a microprocessor centering on a CPU, and includes, in addition to the CPU, a ROM that stores a processing program, a RAM that temporarily stores data, an input/output port, and a communication port. Signals from various sensors are input to the HVECU 70 through the input port. As the signals that are input to the HVECU 70, for example, wheel speeds Vwa to Vwd of drive wheels 39a, 39b or driven wheels 39c, 39d from wheel speed sensors 89a to 89d attached to the drive wheels 39a, 39b or the driven wheels 39c, 39d can be exemplified. An ignition signal from an ignition switch 80 and a shift position SP from a shift position sensor 82 that detects an operation position of a shift lever 81 can also be exemplified. An accelerator operation amount Acc from an accelerator pedal position sensor 84 that detects a depression amount of an accelerator pedal 83, and a brake pedal position BP from a brake pedal position sensor 86 that detects a depression amount of a brake pedal 85 can also be exemplified. A vehicle speed V from a vehicle speed sensor 88 and a road gradient θrd from a gradient sensor 89 can also be exemplified. The shift position SP includes a parking position (P position), a reverse position (R position), a neutral position (N position), a forward position (D position), and the like. Various control signals, for example, an on and off control signal to a system main relay 56 and the like are output from the HVECU 70 through the output port. As described above, the HVECU 70 is connected to the engine ECU 24, the motor ECU 40, and the battery ECU 52 through the communication port.

The hybrid vehicle 20 of the example configured as above travels in a hybrid traveling (HV traveling) mode in which traveling is performed with the operation of the engine 22, or in an electrically powered traveling (EV traveling) mode in which traveling is performed without the operation of the engine 22.

In the HV traveling mode, the HVECU 70 set requested torque Td* requested for traveling (requested for the drive shaft 36) based on the accelerator operation amount Acc, the brake pedal position BP, and the vehicle speed V. Requested power Pd* requested for traveling (requested for the drive shaft 36) is calculated by multiplying the set requested torque Td* by a rotation speed Nd of the drive shaft 36 (the rotation speed Nm2 of the motor MG2). Subsequently, requested power Pe* requested for the vehicle (requested for the engine 22) is set by subtracting requested charge/discharge power Pb* (a positive value when electric power is discharged from the battery 50) based on the state of charge SOC of the battery 50 from the requested power Pd*. Next, a target rotation speed Ne* or target torque Te* of the engine 22 and the torque commands Tm1*, Tm2* of the motors MG1, MG2 are set such that the requested power Pe* is output from the engine 22 and the requested torque Td* is output from the drive shaft 36 within a range of the input and output limits Win, Wout of the battery 50. Subsequently, a target voltage VH* of the high voltage side electric power line 54a (capacitor 57) is set based on the torque commands Tm1*, Tm2* or the rotation speeds Nm1, Nm2 of the motors MG1, MG2. Then, the target rotation speed Ne* or the target torque Te* of the engine 22 is transmitted to the engine ECU 24, and the torque commands Tm1*, Tm2* of the motors MG1, MG2 or the target voltage VH* of the capacitor 57 is transmitted to the motor ECU 40. The engine ECU 24 performs intake air amount control, fuel injection control, ignition control, and the like of the engine 22 such that the engine 22 is operated based on the target rotation speed Ne* and the target torque Te*. The motor ECU 40 performs switching control of the transistors T11 to T16, T21 to T26 of the inverters 41, 42 such that the motors MG1, MG2 are driven with the torque commands Tm1*, Tm2*. In addition, the motor ECU 40 performs switching control of the transistors T31, T32 of the boost and deboost converter 55 such that the voltage VH of the high voltage side electric power line 54a (capacitor 57) becomes the target voltage VH*.

In the EV traveling mode, the HVECU 70 sets the requested torque Td* based on the accelerator operation amount Acc, the brake pedal position BP, and the vehicle speed V, sets a value of 0 as the torque command Tm1* of the motor MG1, and sets the torque command Tm2* of the motor MG2 such that the requested torque Td* is output to the drive shaft 36 within a range of the input and output limits Win, Wout of the battery 50. The target voltage VH* of the high voltage side electric power line 54a (capacitor 57) is set based on the torque commands Tm1*, Tm2* or the rotation speeds Nm1, Nm2 of the motors MG1, MG2. Then, the torque commands Tm1*, Tm2* of the motors MG1, MG2 or the target voltage VH* of the high voltage side electric power line 54a is transmitted to the motor ECU 40. The control of the inverters 41, 42 or the boost and deboost converter 55 by the motor ECU 40 has been described above.

The control of the inverters 41, 42 by the motor ECU 40 will be described. In controlling the inverters 41, 42, the motor ECU 40 generates PWM signals of the transistors T11 to T16, T21 to T26 based on modulation factors Rm1, Rm2 and voltage phases θp1, θp2 of voltages and pulse numbers Np1, Np2 per unit cycle (in the example, one cycle of the electric angles θe1, θe2 of the motors MG1, MG2) and performs switching of the transistors T11 to T16, T21 to T26. The modulation factors Rm1, Rm2 and the voltage phases θp1, θp2 are set based on the torque commands Tm1*, Tm2* of the motors MG1, MG2. The pulse numbers Np1, Np2 are set based on target operation points (rotation speeds Nm1, Nm2 and torque commands Tm1*, Tm2*) of the motors MG1, MG2, the modulation factors Rm1, Rm2, and the like. The PWM signals of the transistors T11 to T16, T21 to T26 are generated such that total loss Lsum1, Lsum2 of the motors MG1, MG2 and inverters 41, 42 are adjusted with adjustment (reduction or increase) of a harmonic component of a desired order.

Hereinafter, a generation method of the PWM signals of the transistors T11 to T16, T21 to T26 and a setting method of the pulse numbers Np1, Np2 will be described. In the description, reference numerals "MG1, MG2" or "41, 42", "T11 to T16, T21 to T26", and the like will be omitted.

First, the generation method of the PWM signal will be described. When a constraint that a PWM signal is generated to have half-wave symmetry represented by "f(ωt)=−f(ωt+π)" is used when an angular velocity of a rotor of a motor is "ω" and time is "t", a PWM signal f(θe) when the electric angle of the motor is "θe" can be represented by Expression (1) in a case where a Fourier series expansion is used. With the use of the constraint, it is possible to achieve erasure of an even-order harmonic component or simplification of control. In Expression (1), "n" is an order of a harmonic component and 1, 3, 5, 7, . . . (odd integer), and "M" is a switching frequency (excluding switching at a reference electric angle (for example, 0°, 180°, or the like)) of a transistor per half cycle of the electric angle θe of the motor. The switching frequency M becomes "M=Np−1" when the pulse number per cycle of the electric angle θe of the motor is "Np". In Expression (1), "θe,m" is an m-th switching electric angle of the transistor, "an" is a Fourier cosine coefficient, "bn" is a Fourier sine coefficient, and "a0" is a direct current component. From the Fourier cosine coefficient an and the Fourier sine coefficient bn in Expression (1), amplitude Cn of a harmonic component of each order and a phase αn of a harmonic component of each order can be represented by Expression (2).

$$f(\theta_e) = \frac{a_0}{2} + \sum_{n=1}^{\infty}(a_n \cos n\theta_e + b_n \sin n\theta_e) \quad (1)$$

$$a_n = \frac{1}{\pi}\int_0^{2\pi} f(\theta_e)\cos n\theta_e d\theta_e = -\frac{2}{n\pi}\sum_{m=1}^{M}(-1)^m \sin n\theta_{e,m}$$

$$b_n = \frac{1}{\pi}\int_0^{2\pi} f(\theta_e)\sin n\theta_e d\theta_e = \frac{2}{n\pi}\left\{\left(\sum_{m=1}^{M}(-1)^m \cos n\theta_{e,m}\right) + 1\right\}$$

$$C_n = \sqrt{a_n^2 + b_n^2} \quad (2)$$

$$\alpha_n = \tan^{-1}\frac{b_n}{a_n}$$

A constraint that a PWM signal is generated to have odd symmetry represented by "f(ωt)=f(π−ωt)", instead of half-wave symmetry may be used. With the use of the constraint, it is possible to erase a cosine wave component of a harmonic. In this case, "n" is 1, 5, 7, 11, . . . (odd integer excluding a multiple of three), and "M" is a switching frequency (excluding switching at a reference electric angle) of a transistor per ¼ cycle of the electric angle θe of the motor and becomes "M=(Np−1)/2".

In the example, as the generation method of the PWM signal, a method that adjusts (reduces or increases) the total of the harmonic component of each order is considered. Out of motor loss, iron loss Wi can be represented by Expression (3) as Steinmetz experimental formula. In Expression (3), "Wh" is hysteresis loss, "We" is eddy current loss, "Kh" is a hysteresis loss coefficient, "Bm" is magnetic flux density, "fm" is a rotating magnetic flux frequency of the motor, and "Ke" is an eddy current loss coefficient.

$$W_i = W_h + W_e = K_h B_m^2 f_m + K_e B_m^2 f_m^2 \quad (3)$$

Focusing on where the eddy current loss We that is a high proportion in total iron loss of the motor, in a case where a phase potential of the motor is "Vm", in general, since the magnetic flux density Bm and a value (Vm/fm) obtained by dividing the phase potential Vm of the motor by the rotating magnetic flux frequency fm have a proportional relationship, Expression (4) can be derived. Then, in Expression (4), in a case where the hysteresis loss coefficient Ke (integer) is neglected, a rotating magnetic flux frequency fm of an order n is substituted with the order n, a phase potential of the motor of the order n is "Vmn", and a maximum order that is considered in order to reduce or increase loss is "N" (for example, 107th order), the total of the harmonic component of each order can be represented by Expression (5). In reducing or increasing motor loss, the value of Expression (5) may be reduced or increased. Then, since the phase current Vmn of the motor of the order n means the amplitude Cn of the harmonic component of the order n, a value of Expression (6) may be reduced or increased.

$$W_e \propto \frac{K_e V_m^2}{f_m} \quad (4)$$

$$\sum_{n=1}^{N} \frac{V_{mn}^2}{n} \quad (5)$$

$$\sum_{n=1}^{N} \frac{C_n^2}{n} \quad (6)$$

In a case where the PWM signal f(θe) of Expression (1) is set such that the value of Expression (6) is reduced or increased, the total of the harmonic component of each order is reduced or increased, and motor loss is reduced or increased. Preferably, the PWM signal f(θe) of Expression (1) is set such that the value of Expression (6) is minimized or maximized. Hereinafter, as a generation mode of a PWM signal, a mode in which the PWM signal f(θe) of Expression (1) is set such that the value of Expression (6) is minimized is referred to as a "loss reduction mode", and a mode in which the PWM signal f(θe) of Expression (1) is set such that the value of Expression (6) is maximized is referred to as a "loss increase mode". In Expression (1), a value of 0 is set as "a1" so as to make a one-dimensional fundamental phase be 0°. In this way, the PWM signal of each transistor of the inverter can be generated.

Figure 3:
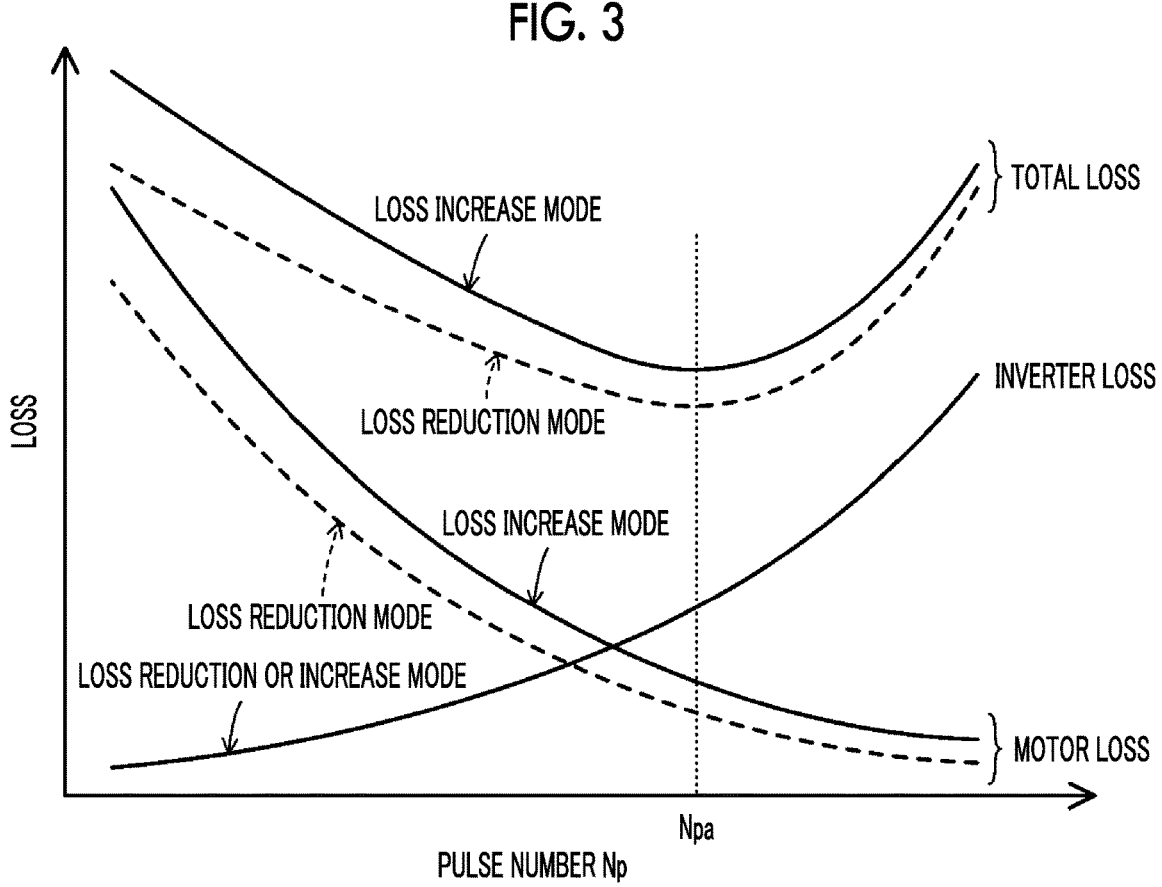
FIG. 3 is an explanatory view showing an example of the relationship of a pulse number per cycle of an electric angle of the motor and motor loss, inverter loss, and total loss.

Next, the setting method of the pulse number Np will be described. FIG. 3 is an explanatory view showing an example of the relationship between the pulse number Np per cycle of the electric angle θe of the motor and motor loss, inverter loss, and total loss (the sum of motor loss and inverter loss). The relationship is different according to an operation point (rotation speed or torque) of the motor or a modulation factor. In FIG. 3, in regard to the motor loss or the total loss, a solid line indicates a case of a loss increase mode, and a broken line indicates a case of a loss reduction mode. As will be understood from FIG. 3, the inverter loss (switching loss) becomes greater when the pulse number Np is greater, and the motor loss becomes greater when the pulse number Np is smaller. The former is because the switching frequency of the transistor becomes greater when the pulse number Np is greater, and the latter is because a ripple current of the motor becomes greater when the pulse number Np is smaller. In the example, a value Npa at which the total loss is minimized in the loss reduction mode is set as the pulse number Np in the loss reduction mode and the loss increase mode. In the loss increase mode, an advantage of increasing the motor loss with the same pulse number Np (value Npa) as in the loss reduction mode to increase the total loss is as follows. In a case where the pulse number Np is made smaller than the value Npa, it is possible to increase the motor loss to increase the total loss even when the loss increase mode is not executed (even when the loss reduction mode is maintained), it is possible to increase the motor loss to increase the total loss; however, the controllability of the motor is deteriorated. In a case where the pulse number Np is made greater than the value Npa, it is possible to increase the inverter loss (switching loss) to increase the total loss even when the loss increase mode is not executed (even when the loss reduction mode is maintained); however, there is a limit to an increase in inverter loss due to a protection requirement of the transistor or a control cycle requirement of the inverter. In contrast, in a case where the pulse number Np is the value Npa and the loss increase mode is executed, it is possible to increase the motor loss to increase the total loss without causing deterioration of the controllability of the motor and an increase in inverter loss.

Figure 4:
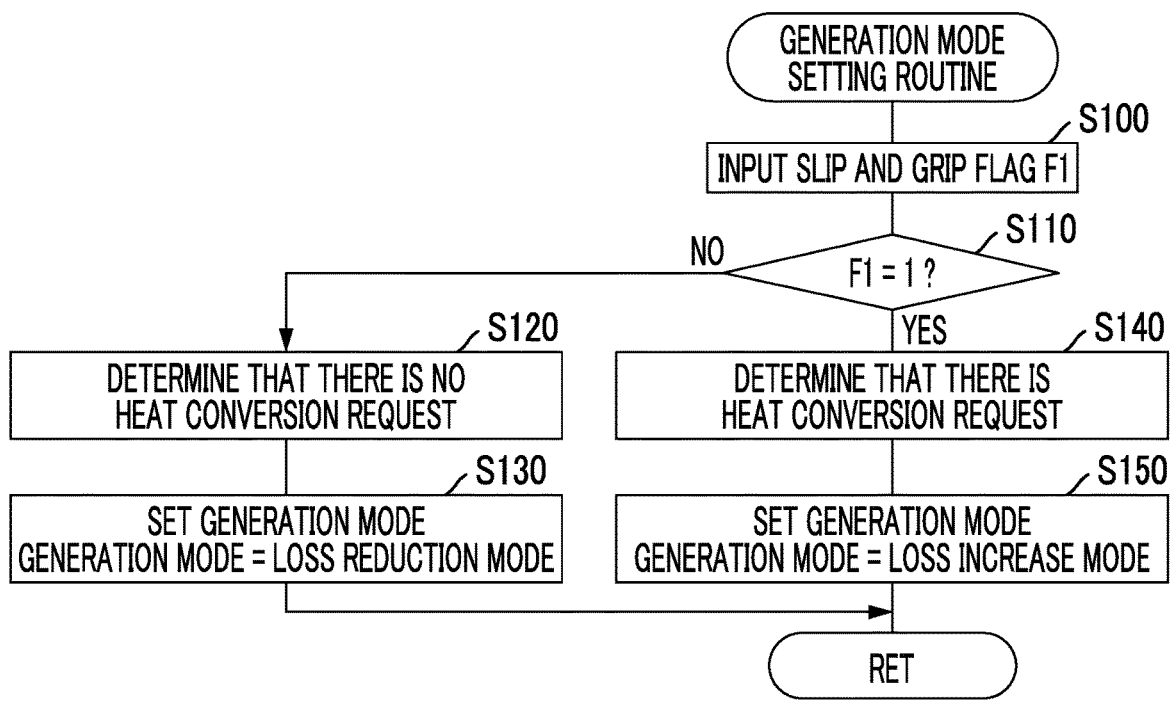
FIG. 4 is a flowchart showing an example of a generation mode setting routine that is executed by a motor ECU of the example.

Next, the operation of the hybrid vehicle 20 of the example configured as above, in particular, an operation in a case of setting a generation mode of the PWM signals of the transistors T11 to T16, T21 to T26 of the inverters 41, 42 will be described. FIG. 4 is a flowchart showing an example of a generation mode setting routine that is executed by the motor ECU 40 of the example. The routine is repeatedly executed.

In a case where the generation mode setting routine is executed, the motor ECU 40 first input a value of a slip and grip flag F1 (Step S100). As the slip and grip flag F1, a value set by a first flag setting routine (not shown) that is executed by the HVECU 70 is input by communication. In the first flag setting routine, when the drive wheels 39a, 39b are slipped and then gripped, the HVECU 70 sets a value of 1 as the slip and grip flag F1; otherwise, the HVECU 70 sets a value of 0 as the slip and grip flag F1. In the example, a period from when a slip speed Vs of the drive wheels 39a, 39b reaches a peak (maximum) and starts to decrease until the slip speed Vs becomes equal to or lower than a threshold Vsref slightly greater than a value of 0 is assumed as "when the drive wheels 39a, 39b are gripped". The slip speed Vs of the drive wheels 39a, 39b can be calculated as, for example, the difference between an average value Vwab of wheel speeds Vwa, Vwb of the drive wheels 39a, 39b from the wheel speed sensors 89a, 89b and an average value Vwcd of wheel speeds Vwc, Vwd of the driven wheels 39c, 39d from the wheel speed sensors 89c, 89d.

In a case where data is input in this manner, the input value of the slip and grip flag F1 is examined (Step S110). Then, when the slip and grip flag F1 is the value of 0, determination is made that there is no heat conversion request of drive electric power of the motors MG1, MG2 (Step S120), the loss reduction mode is set as a generation mode of a PWM signal (Step S130), and the routine ends. In this case, in a case of controlling the inverters 41, 42, the PWM signals of the transistors T11 to T16, T21 to T26 of the inverters 41, 42 are generated in the loss reduction mode. With this, it is possible to decrease the total loss Lsum1, Lsum2 of the motors MG1, MG2 and the inverters 41, 42.

In Step S110, when the slip and grip flag F1 is the value of 1, determination is made that there is the heat conversion request of the drive electric power of the motors MG1, MG2 (Step S140), the loss increase mode is set as a generation mode of a PWM signal (Step S150), and the routine ends. In this case, in a case of controlling the inverters 41, 42, the PWM signals of the transistors T11 to T16, T21 to T26 of the inverters 41, 42 are generated in the loss increase mode. With this, it is possible to increase the total loss Lsum1, Lsum2.

Figure 5:
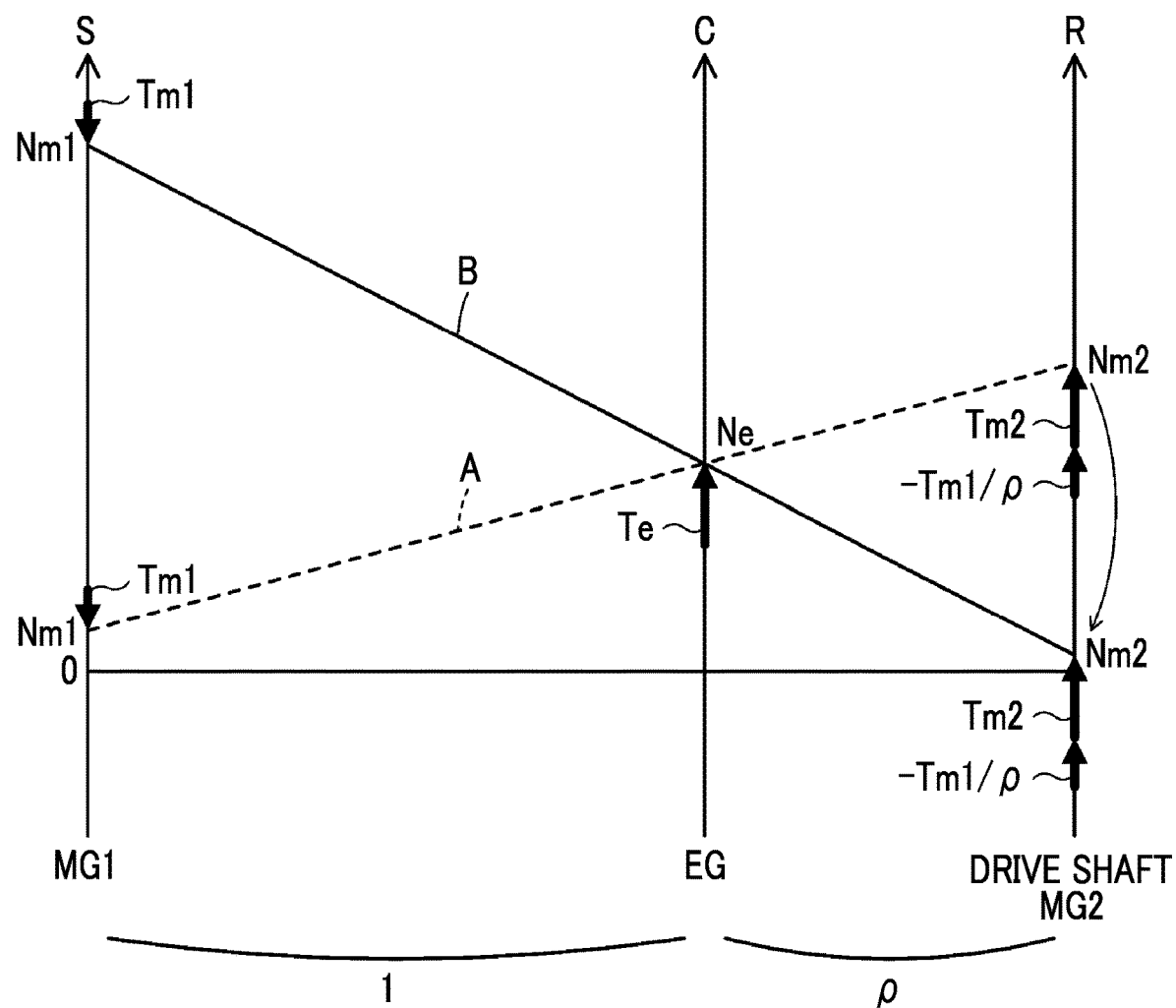
FIG. 5 is an explanatory view showing an example of a collinear diagram when drive wheels are slipped and then gripped.

FIG. 5 is an explanatory view showing an example of a collinear diagram when the drive wheels 39a, 39b are slipped and then gripped. In the drawing, an S axis on the left indicates a rotation speed of the sun gear of planetary gear 30 that is the rotation speed Nm1 of the motor MG1, a C axis indicates a rotation speed of the carrier of the planetary gear 30 that is the rotation speed Ne of the engine 22, and an R axis indicates a rotation speed of the ring gear (drive shaft 36) of the planetary gear 30 that is the rotation speed Nm2 of the motor MG2. "ρ" indicates a gear ratio ((the number of teeth of the sun gear)/(the number of teeth of the ring gear)) of the planetary gear 30. Two thick arrows of the R axis indicate torque that is output from the motor MG1 and applied to the drive shaft 36 through the planetary gear 30, and torque that is output from the motor MG2 and applied to the drive shaft 36. A straight broken line A indicates a manner when the drive wheels 39a, 39b are slipped, and a straight solid line B indicates a manner when the drive wheels 39a, 39b are gripped, and the rotation speed Nm2 of the motor MG2 rapidly decreases and the rotation speed Nm1 of the motor MG1 rapidly increases. As shown in the drawing, in a case where the drive wheels 39a, 39b are gripped from a state in which the drive wheels 39a, 39b are slipped, electric power Pmi2 (including the total loss Lsum2) of the motor MG2 and the inverter 42 rapidly decreases with a rapid decrease in the rotation speed Nm2 of the motor MG2, and electric power Pmi1 (including the total loss Lsum1) of the motor MG1 and the inverter 41 rapidly decreases (rapidly increases as a value on an electric power generation side) with a rapid increase in the rotation speed Nm1 of the motor MG1. For this reason, the voltage VH of the high voltage side electric power line 54a (capacitor 57) increases. In the example, when the drive wheels 39a, 39b are slipped and then gripped, determination is made that there is the heat conversion request of the drive electric power of the motors MG1, MG2, the loss increase mode is set as a generation mode of a PWM signal, whereby the total loss Lsum1, Lsum2 are increased compared to a case where the loss reduction mode is set as a generation mode of a PWM signal. With this, it is possible to suppress a rapid decrease in electric power Pmi1, Pmi2. As a result, it is possible to suppress an excessive increase (an increase beyond an allowable upper limit voltage) in the voltage VH of the high voltage side electric power line 54a.

Figure 6:
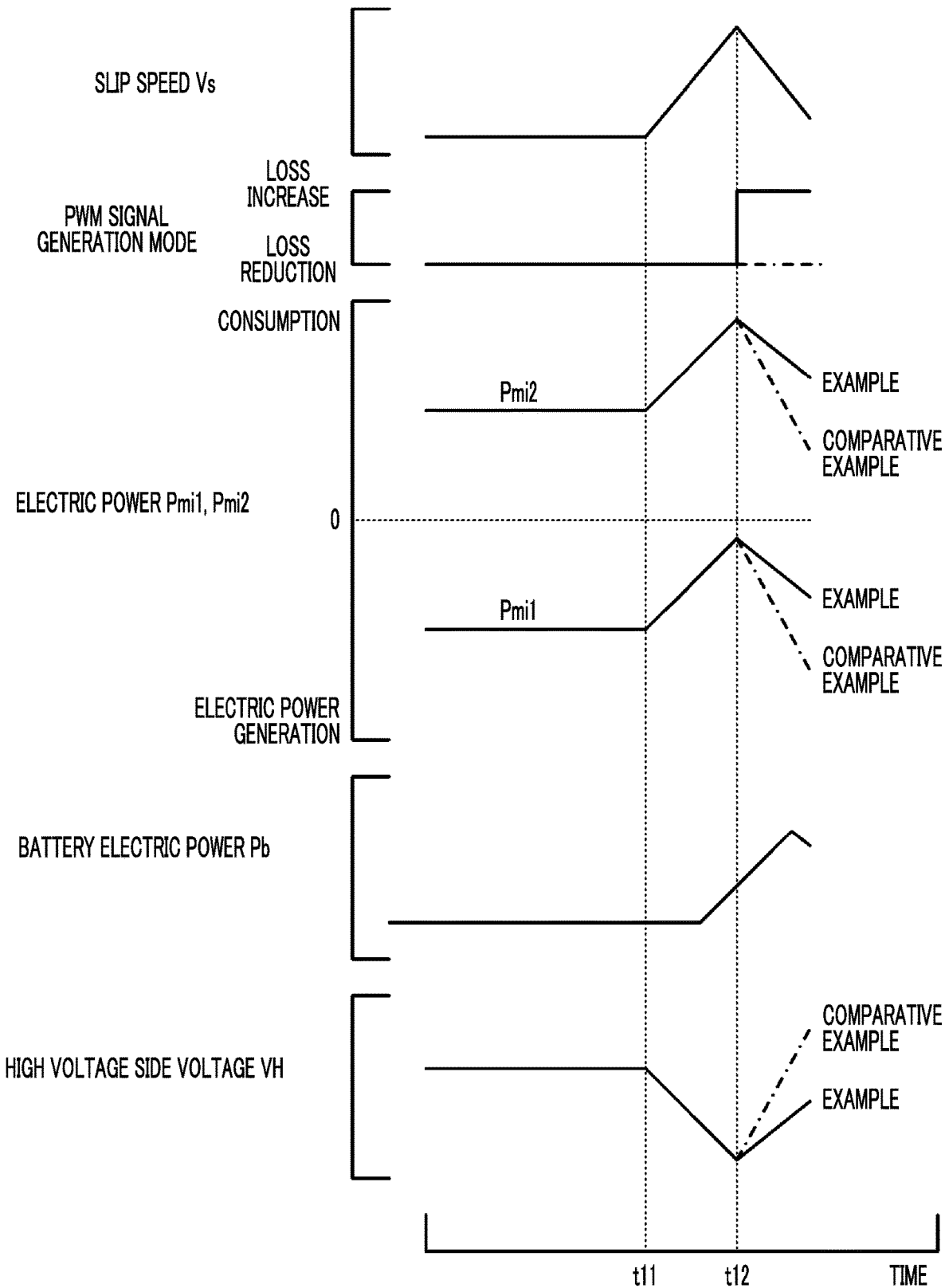
FIG. 6 is an explanatory view showing an example of a mode when the drive wheels are slipped and then gripped.

FIG. 6 is an explanatory view showing an example of a manner when the drive wheels 39a, 39b are slipped and then gripped. In the drawing, in regards of the generation mode of the PWM signal, the electric power Pmi1, Pmi2 of the motors MG1, MG2, and the voltage VH of the high voltage side electric power line 54a, a solid line indicates a manner of the example in which the generation mode of the PWM signal is switched from the loss reduction mode to the loss increase mode when the drive wheels 39a, 39b are gripped, and a one-dot-chain line indicates a manner of a comparative example in which the generation mode of the PWM signal is maintained in the loss reduction mode even when the drive wheels 39a, 39b are gripped. As shown in the drawing, in a case where the slip speed Vs of the drive wheels 39a, 39b increases from time t11, the voltage VH of the high voltage side electric power line 54a decreases with an increase in electric power Pmi1, Pmi2, and the electric power Pb of the battery 50 increases slowly. Then, in a case where the slip speed Vs reaches a peak at time t12 and starts to decrease, in the example, the generation mode of the PWM signal is switched from the loss reduction mode to the loss increase mode. With this, it is possible to increase the total loss Lsum1, Lsum2 and to suppress a rapid decrease in electric power Pmi1, Pmi2 compared to the comparative example in which the generation mode of the PWM signal is maintained in the loss reduction mode. As a result, it is possible to suppress an excessive increase in the voltage VH of the high voltage side electric power line 54a. Though not shown, thereafter, in a case where the slip speed Vs of the drive wheels 39a, 39b becomes equal to or less than the threshold Vsref, the generation mode of the PWM signal is switched from the loss increase mode to the loss reduction mode.

In the hybrid vehicle 20 of the example described above, when the drive wheels 39a, 39b are slipped and then gripped, determination is made that there is the heat conversion request of the drive electric power of the motors MG1, MG2, and the loss increase mode is set as the generation mode of the PWM signal. With this, it is possible to increase the total loss Lsum1, Lsum2 and to suppress a rapid decrease in electric power Pmi1, Pmi2 compared to a case where the generation mode of the PWM signal is maintained in the loss reduction mode. As a result, it is possible to suppress an excessive increase in the voltage VH of the high voltage side electric power line 54a.

Figure 7:
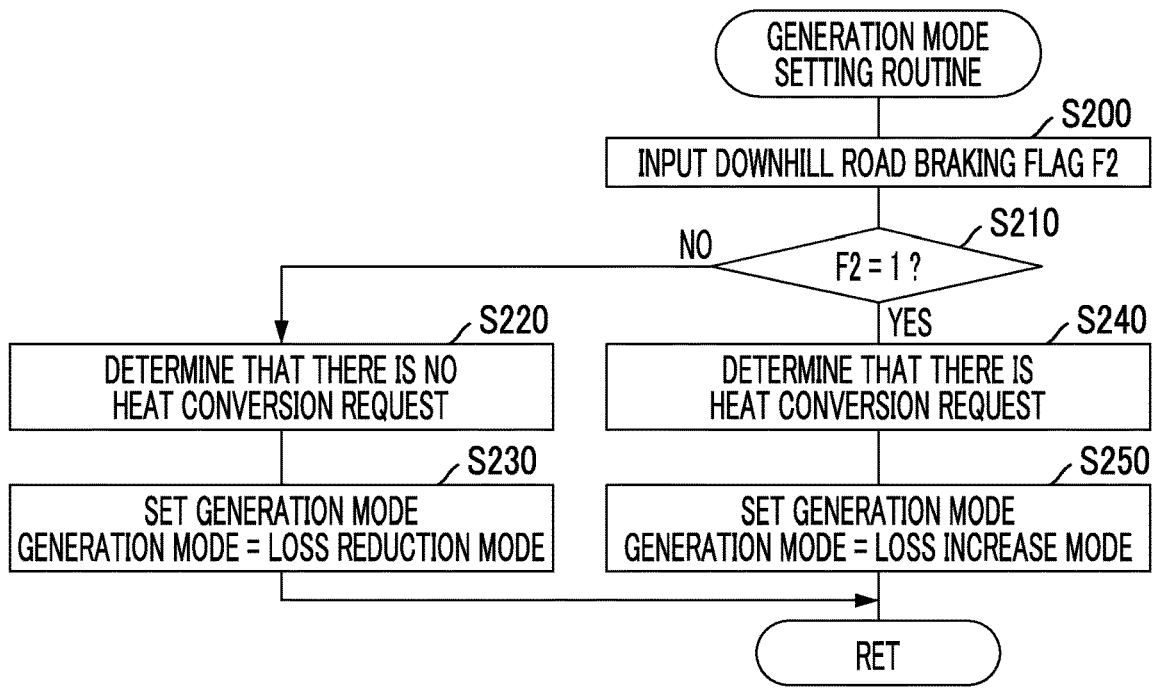
FIG. 7 is a flowchart showing an example of a generation mode setting routine of a modification example.

In the hybrid vehicle 20 of the example, the motor ECU 40 executes the generation mode setting routine of FIG. 4; however, the motor ECU 40 may execute a generation mode setting routine of FIG. 7. In a case where the generation mode setting routine of FIG. 7 is executed, the motor ECU 40 first inputs a value of a downhill road braking flag F2 (Step S200). As the downhill road braking flag F2, a value set by a second flag setting routine (not shown) that is executed by the HVECU 70 is input by communication. In the second flag setting routine, the HVECU 70 sets a value of 1 as the downhill road braking flag F2 when an output of braking torque to the drive shaft 36 is requested on a downhill road (when the requested torque Td* has a negative value); otherwise, the HVECU 70 sets a value of 0 as the downhill road braking flag F2. Determination regarding whether or not the vehicle is on a downhill road can be performed using the road gradient θrd from the gradient sensor 89. As a case where an output of braking torque to the drive shaft 36 is requested, brake-on or accelerator-off and brake-off can be considered.

In a case where data is input in this manner, the input value of the downhill road braking flag F2 is examined (Step S210). Then, when the downhill road braking flag F2 is the value of 0, determination is made that there is no heat conversion request of the drive electric power of the motors MG1, MG2 (Step S220), the loss reduction mode is set as the generation mode of the PWM signal (Step S230), and the routine ends. In this case, in a case of controlling the inverters 41, 42, the PWM signals of the transistors T11 to T16, T21 to T26 of the inverters 41, 42 are generated in the loss reduction mode. With this, it is possible to decrease the total loss Lsum1, Lsum2.

In Step S210, when the downhill road braking flag F2 is the value of 1, determination is made that there is the heat conversion request of the drive electric power of the motors MG1, MG2 (Step S240), the loss increase mode is set as the generation mode of the PWM signal (Step S250), and the routine ends. In this case, in controlling the inverters 41, 42, the PWM signals of the transistors T11 to T16, T21 to T26 of the inverters 41, 42 are generated in the loss increase mode. With this, it is possible to increase the total loss Lsum1, Lsum2.

Now, a case where an output of braking torque to the drive shaft 36 is requested is considered. At this time, basically, in order to improve the energy efficiency of the vehicle, the engine 22 is brought into an autonomous operation or operation stop, and the engine 22 and the motor MG2 are controlled such that the requested torque Td* is output to the drive shaft 36 with the regenerative drive of the motor MG2. Hereinafter, such control is referred to as "first braking control". However, in a case where the state of charge SOC of the battery 50 becomes equal to or greater than a threshold Sref (for example, 65%, 70%, 75%, or the like), in order to suppress overcharging of the battery 50, the regenerative drive of the motor MG2 is limited (including being inhibited), and the engine 22 and the motors MG1, MG2 are controlled such that the requested torque Td* is output to the drive shaft 36 by motoring of the engine 22 performing fuel cut with the motor MG1. Hereinafter, such control is referred to as "second braking control". On the other hand, on the downhill road, a time for which the output of the braking torque to the drive shaft 36 is requested may be extended to a certain degree. In a modification example, when the output of the braking torque to the drive shaft 36 is requested on the downhill road, determination is made that there is the heat conversion request of the drive electric power of the motors MG1, MG2, and the generation mode of the PWM signal is set to the loss increase mode, whereby the total loss Lsum2 in a case of regeneratively driving the motor MG2 is increased compared to a case where generation mode of the PWM signal is set to the loss reduction mode. With this, it is possible to suppress an increase in charging electric power of the battery 50, and to suppress an increase in the state of charge SOC of the battery 50 to be equal to or greater than the threshold Sref (to extend the time until the state of charge SOC becomes equal to or greater than the threshold Sref). As a result, it is possible to suppress the execution of the second braking control, and to suppress a feeling of racing of the engine 22 given to the driver.

Figure 8:
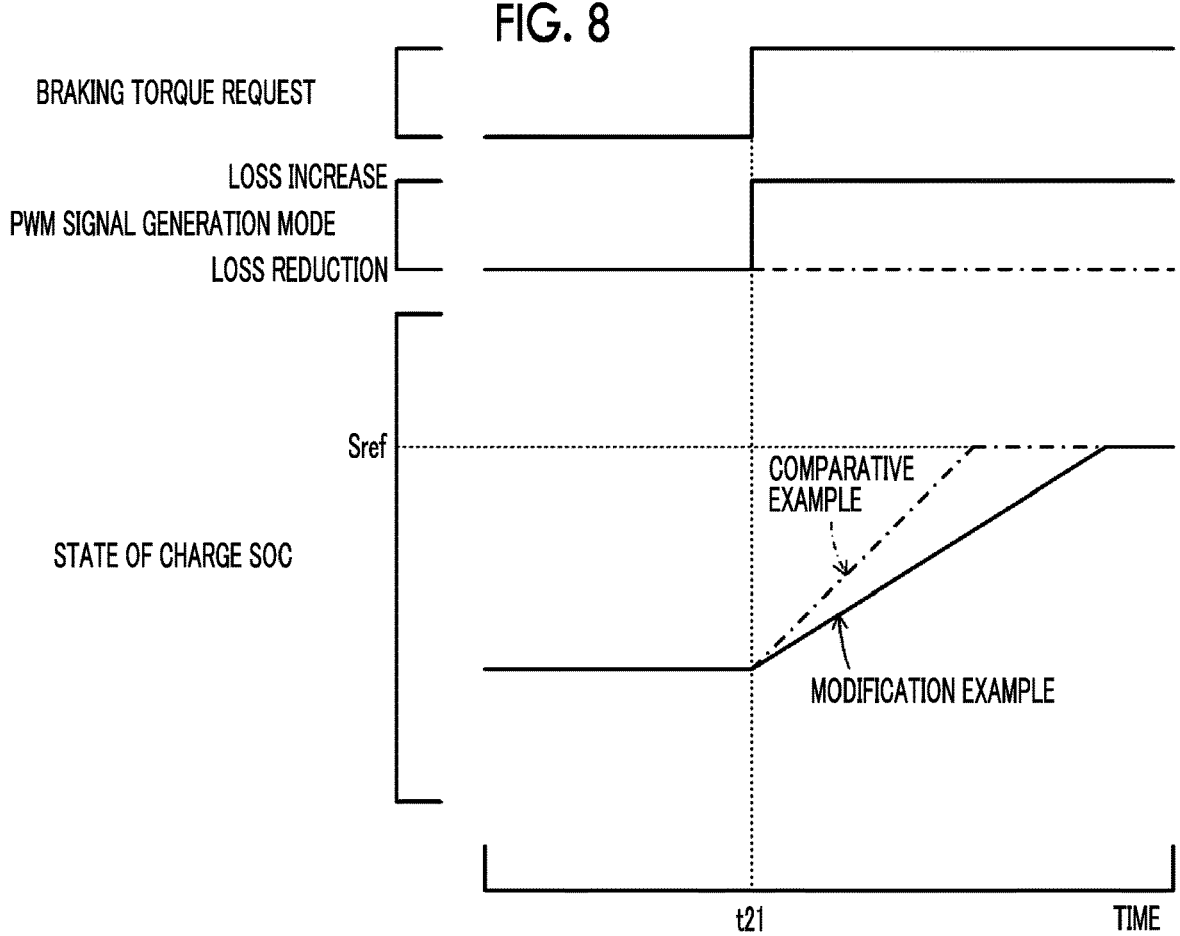
FIG. 8 is an explanatory view of an example of a state of charge of a battery when an output of braking torque to a drive shaft is requested on a downhill road.

FIG. 8 is an explanatory view showing an example of a manner of the state of charge SOC of the battery 50 when the output of the braking torque to the drive shaft 36 is requested on the downhill road. In the drawing, in regard to the generation mode of the PWM signal or the state of charge SOC of the battery 50, a solid line indicates a manner of a modification example in which the generation mode of the PWM signal is switched from the loss reduction mode to the loss increase mode when the output of the braking torque to the drive shaft 36 is requested on the downhill road, and a one-dot-chain line indicates a manner of a comparative example in which the generation mode of the PWM signal is maintained in the loss reduction mode even when the output of the braking torque to the drive shaft 36 is requested on the downhill road. As shown in the drawing, in a case where the output of the braking torque to the drive shaft 36 is requested at time t21 on the downhill road, in the modification example, the generation mode of the PWM signal is switched from the loss reduction mode to the loss increase mode. Accordingly, it is possible to increase the total loss Lsum1 in a case of regeneratively driving the motor MG2, to suppress an increase in charging electric power of the battery 50, and to suppress an increase in the state of charge SOC of the battery 50 to be equal to or greater than the threshold Sref (to extend the time until the state of charge SOC of the battery 50 becomes equal to or greater than the threshold Sref) compared to a case where the generation mode of the PWM signal is maintained in the loss reduction mode. As a result, it is possible to suppress the execution of the second braking control, and to suppress a feeling of racing of the engine 22 given to the driver.

Figure 9:
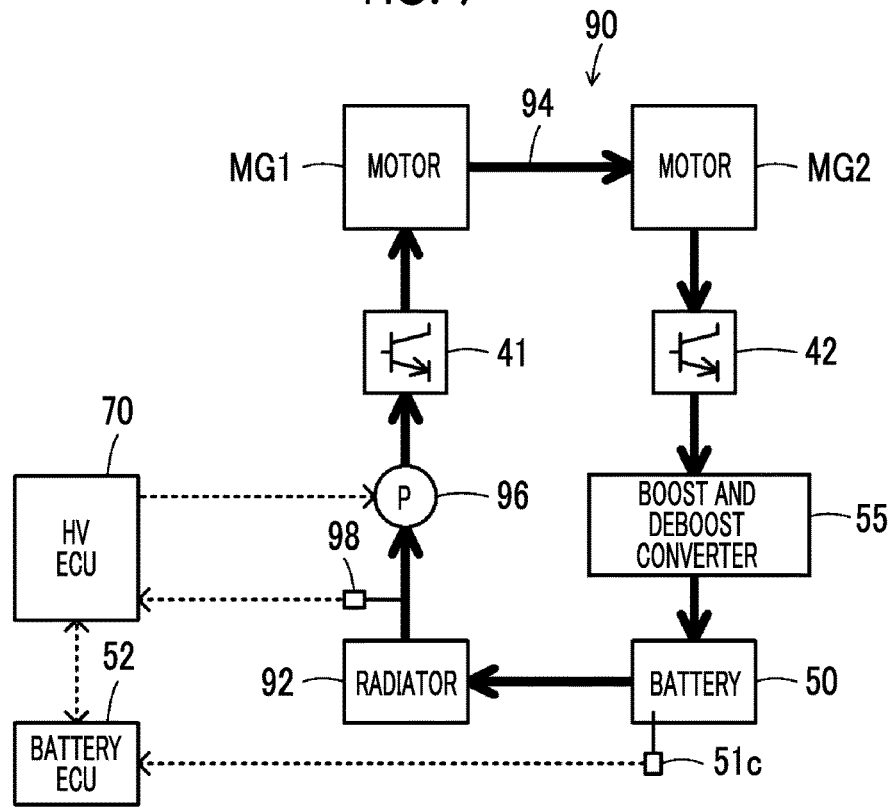
FIG. 9 is a configuration diagram showing the outline of the configuration of a cooling device.
Figure 10:
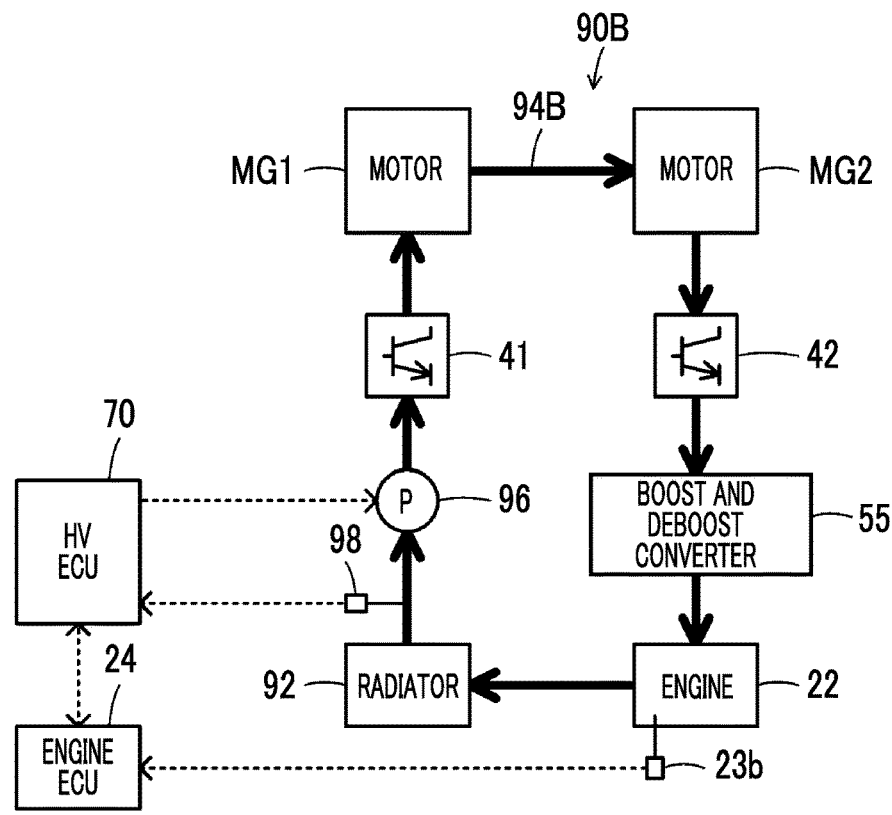
FIG. 10 is a configuration diagram showing the outline of the configuration of a cooling device.

In the hybrid vehicle 20 of the example, a cooling device that cools the motors MG1, MG2, the inverters 41, 42, and the like has not been described; however, as shown in a cooling device 90 of FIG. 9, a cooling device 90 that cools the motors MG1, MG2, the inverters 41, 42, the boost and deboost converter 55, and the battery 50 may be provided, or as shown in a cooling device 90B of FIG. 10, a cooling device 90B that cools the motors MG1, MG2, the inverters 41, 42, the boost and deboost converter 55, and the engine 22 may be provided. Hereinafter, description will be provided in order.

First, a case where the cooling device 90 of FIG. 9 is provided will be described. As shown in FIG. 9, the cooling device 90 includes a radiator 92 that performs heat exchange between a coolant (long-life coolant (LLC)) and outside air, a circulation flow passage 94 that includes the motors MG1, MG2, the inverters 41, 42, the boost and deboost converter 55, and the battery 50, and an electric pump 96 that pumps the coolant such that the coolant circulates through the circulation flow passage 94. The circulation flow passage 94 is formed such that the coolant flows in an order of the radiator 92, the inverter 41, the motor MG1, the motor MG2, the inverter 42, the boost and deboost converter 55, the battery 50, and the radiator 92. The flow order of the coolant in the circulation flow passage 94 is not limited thereto. A coolant temperature Tw1 from a temperature sensor 98 attached to the circulation flow passage 94 is input to the HVECU 70 through the input port, and a control signal to the electric pump 96 is output from the HVECU 70 through the output port.

Figure 11:
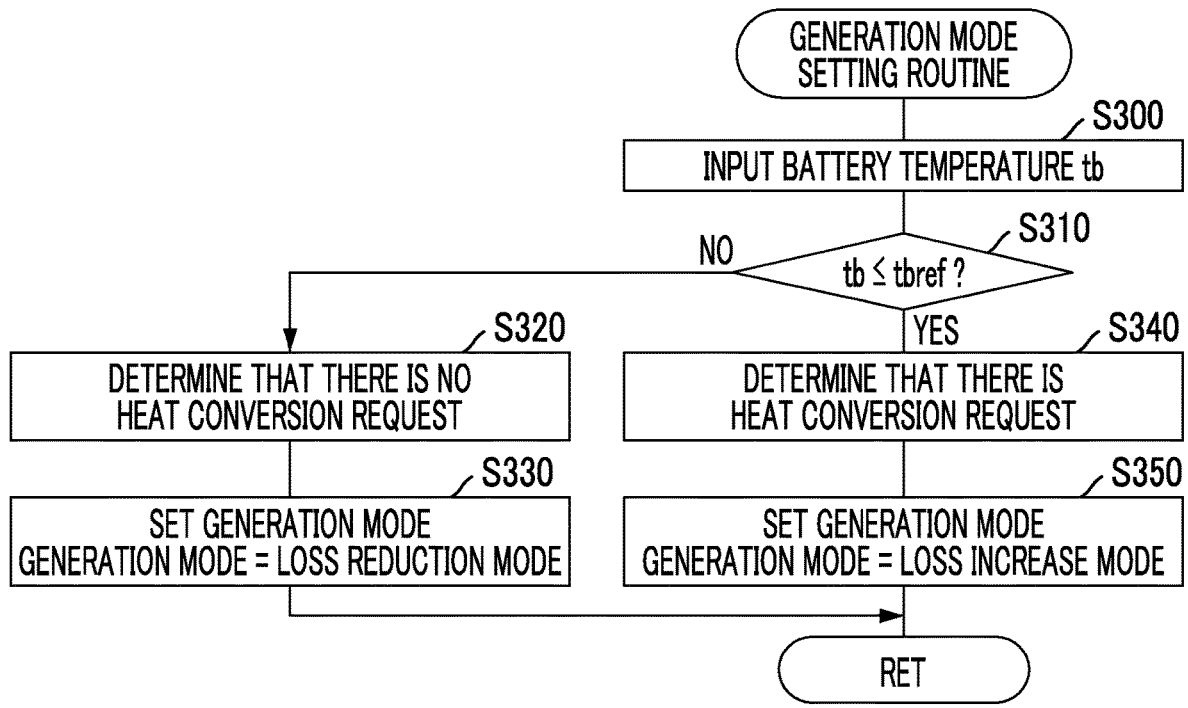
FIG. 11 is a flowchart showing an example of a generation mode setting routine of a modification example.

In a case where the cooling device 90 is provided, the motor ECU 40 may execute a generation mode setting routine of FIG. 11. In a case where the generation mode setting routine of FIG. 11 is executed, the motor ECU 40 first inputs the temperature tb of the battery 50 (Step S300). As the temperature tb of the battery 50, a value detected by the temperature sensor 51c may be input from the battery ECU 52 through the HVECU 70 by communication.

In a case where data is input in this manner, the input temperature tb of the battery 50 is compared with a threshold tbref (Step S310). The threshold tbref is a threshold that is used to determine whether or not there is a heat conversion request of drive electric power of the motors MG1, MG2 according to a temperature increase request of the battery 50, and for example, 0° C., 5° C., 10° C., or the like may be used.

In Step S310, when the temperature tb of the battery 50 is higher than the threshold tbref, determination is made that there is no temperature increase request of the battery 50, and there is no heat conversion request of the drive electric power of the motors MG1, MG2 (Step S320), the loss reduction mode is set as the generation mode of the PWM signal (Step S330), and the routine ends. In this case, in a case of controlling the inverters 41, 42, the PWM signals of the transistors T11 to T16, T21 to T26 of the inverters 41, 42 are generated in the loss reduction mode. With this, it is possible to decrease the total loss Lsum1, Lsum2.

In Step S310, when the temperature tb of the battery 50 is equal to or lower than the threshold tbref, determination is made that there is the heat conversion request of the drive electric power of the motors MG1, MG2 according to the temperature increase request of the battery 50 (Step S340), the loss increase mode is set as the generation mode of the PWM signal (Step S350), and the routine ends. In this case, in a case of controlling the inverters 41, 42, the PWM signals of the transistors T11 to T16, T21 to T26 of the inverters 41, 42 are generated in the loss increase mode. With this, it is possible to increase the total loss Lsum1, Lsum2. As a result, it is possible to promote an increase in temperature of the coolant in the circulation flow passage 94 of the cooling device 90, and to promote an increase in temperature of the battery 50.

Next, a case where the cooling device 90B of FIG. 10 is provided will be described. The cooling device 90B is the same as the cooling device 90 of FIG. 9, excluding that a part of a target through which the coolant circulates is the engine 22, instead of the battery 50. Accordingly, the same portions are represented by the same reference numerals, and detailed description thereof will not be repeated. As shown in FIG. 10, the cooling device 90B includes a circulation flow passage 94B that includes the radiator 92, the motors MG1, MG2, the inverters 41, 42, the boost and deboost converter 55, and the engine 22, and an electric pump 96. The circulation flow passage 94B is formed such that the coolant flows in an order of the radiator 92, the inverter 41, the motor MG1, the motor MG2, the inverter 42, the boost and deboost converter 55, the engine 22, and the radiator 92. The flow order of the coolant in the circulation flow passage 94B is not limited thereto.

Figure 12:
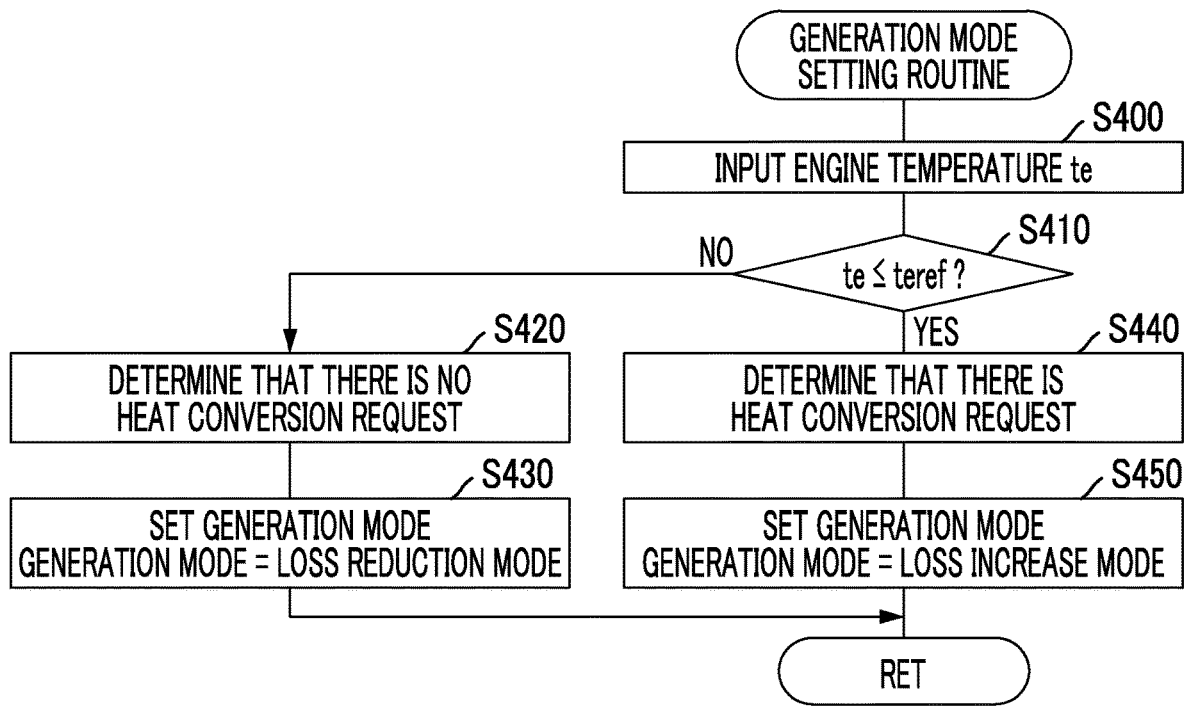
FIG. 12 is a flowchart showing an example of a generation mode setting routine of a modification example.

In a case where the cooling device 90B is provided, the motor ECU 40 may execute a generation mode setting routine of FIG. 12. In a case where the generation mode setting routine of FIG. 12 is executed, the motor ECU 40 first inputs the temperature te of the engine 22 (Step S400).

As the temperature te of the engine 22, a value detected by the temperature sensor 23*b* is input from the engine ECU 24 through the HVECU 70 by communication.

In a case where data is input in this manner, the input temperature te of the engine 22 is compared with a threshold teref (Step S410). The threshold teref is a threshold that is used to determine whether or not there is a heat conversion request of drive electric power of the motors MG1, MG2 according to a warm-up request of the engine 22, and for example, 60° C., 65° C., 70° C., or the like may be used.

In Step S410, when the temperature te of the engine 22 is higher than the threshold teref, determination is made that there is no warm-up request of the engine 22 and there is no heat conversion request of the drive electric power of the motors MG1, MG2 (Step S420), the loss reduction mode is set as the generation mode of the PWM signal (Step S430), and the routine ends. In this case, in a case of controlling the inverters 41, 42, the PWM signals of the transistors T11 to T16, T21 to T26 of the inverters 41, 42 are generated in the loss reduction mode. With this, it is possible to decrease the total loss Lsum1, Lsum2.

In Step S410, when the temperature tb of the battery 50 is equal to or lower than the threshold tbref, determination is made that there is the heat conversion request of the drive electric power of the motors MG1, MG2 according to the temperature increase request of the battery 50 (Step S440), the loss increase mode is set as the generation mode of the PWM signal (Step S450), and the routine ends. In this case, in a case of controlling the inverters 41, 42, the PWM signals of the transistors T11 to T16, T21 to T26 of the inverters 41, 42 are generated in the loss increase mode. With this, it is possible to increase the total loss Lsum1, Lsum2. As a result, it is possible to promote an increase in temperature of the coolant in the circulation flow passage 94 of the cooling device 90, and to promote the warm-up of the engine 22.

In the hybrid vehicle 20 of the example, in the loss increase mode, the total loss Lsum1, Lsum2 are increased with the same pulse numbers Np1, Np2 as in the loss reduction mode; however, the total loss Lsum1, Lsum2 may be increased with the pulse numbers Np1, Np2 different from those in the loss reduction mode.

In the hybrid vehicle 20 of the example, the boost and deboost converter 55 is provided between the inverters 41, 42 and the battery 50; however, a boost and deboost converter may not be provided.

In the hybrid vehicle 20 of the example, the battery 50 is used as an electric power storage device; however, a capacitor may be used.

In the hybrid vehicle 20 of the example, the engine ECU 24, the motor ECU 40, the battery ECU 52, and the HVECU 70 are provided; however, one or all of the ECUs may be constituted as a single electronic control unit.

Figure 13:
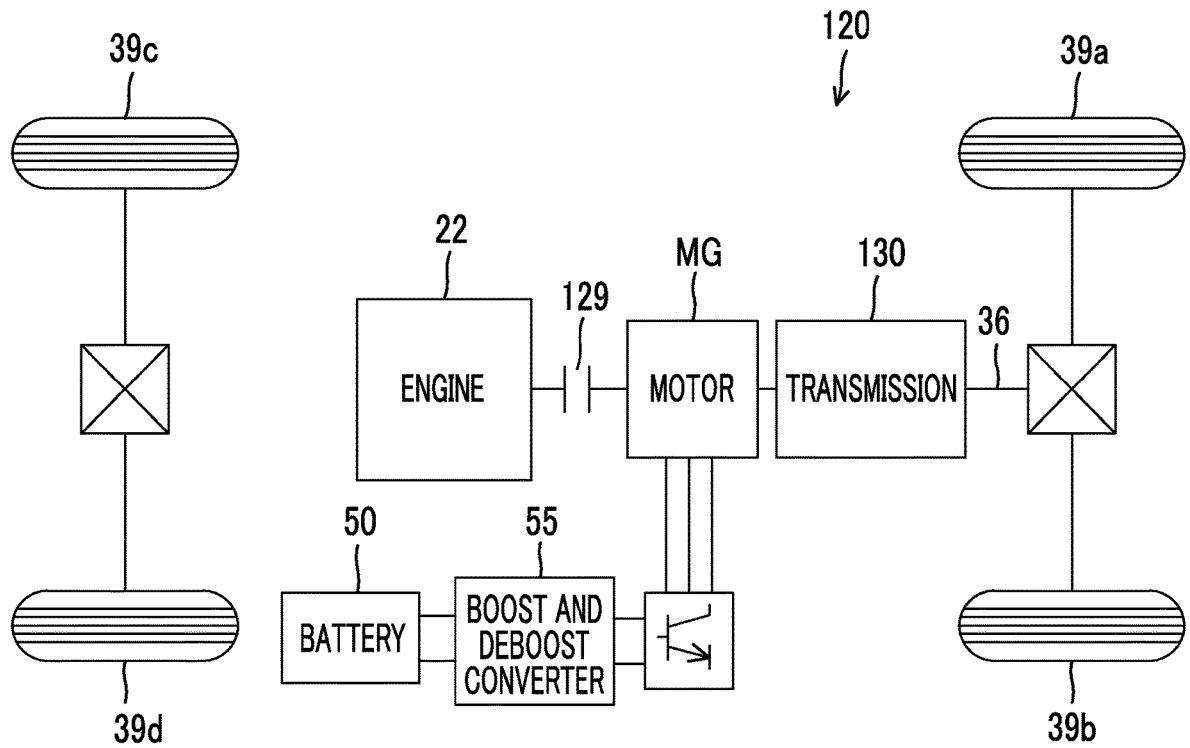
FIG. 13 is a configuration diagram showing the outline of the configuration of a hybrid vehicle of a modification example.
Figure 14:
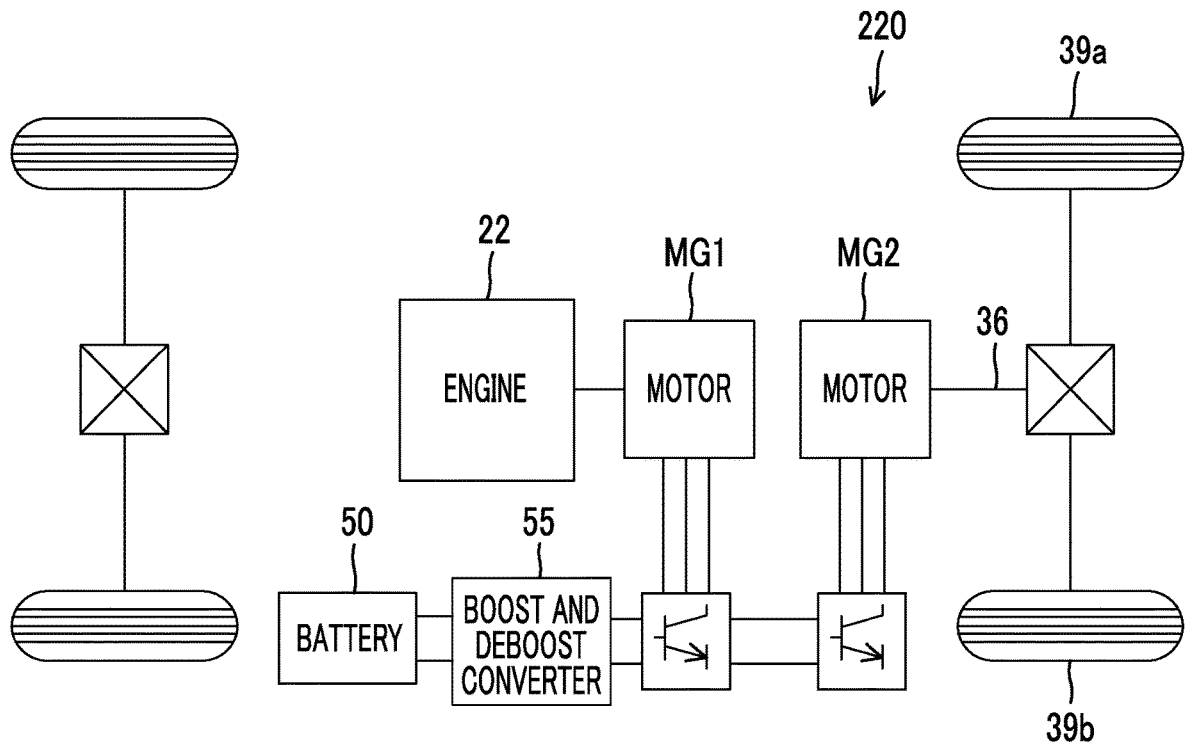
FIG. 14 is a configuration diagram showing the outline of the configuration of a hybrid vehicle of a modification example.

In the example, the hybrid vehicle 20 has a configuration in which the engine 22 and the motor MG1 are connected to the drive shaft 36 coupled to the drive wheels 39*a*, 39*b* through the planetary gear 30, and the motor MG2 is connected to the drive shaft 36. However, as shown in a hybrid vehicle 120 of a modification example of FIG. 13, the hybrid vehicle 120 may have a configuration in which a motor MG is connected to the drive shaft 36 coupled to the drive wheels 39*a*, 39*b* through a transmission 130, and the engine 22 is connected to a rotational shaft of the motor MG through a clutch 129. As shown in a hybrid vehicle 220 of FIG. 14, a so-called series hybrid vehicle 220 may have a configuration in which a motor MG2 for traveling is connected to the drive shaft 36 coupled to the drive wheels 39*a*, 39*b*, and a motor MG1 for electric power generation is connected to an output shaft of the engine 22. In a case of the configurations of the hybrid vehicles 120, 220, the generation mode setting routine of FIG. 11 is executed, thereby promoting an increase in temperature of the battery 50, or the generation mode setting routine of FIG. 12 is executed, thereby promoting the warm-up of the engine 22.

Figure 15:
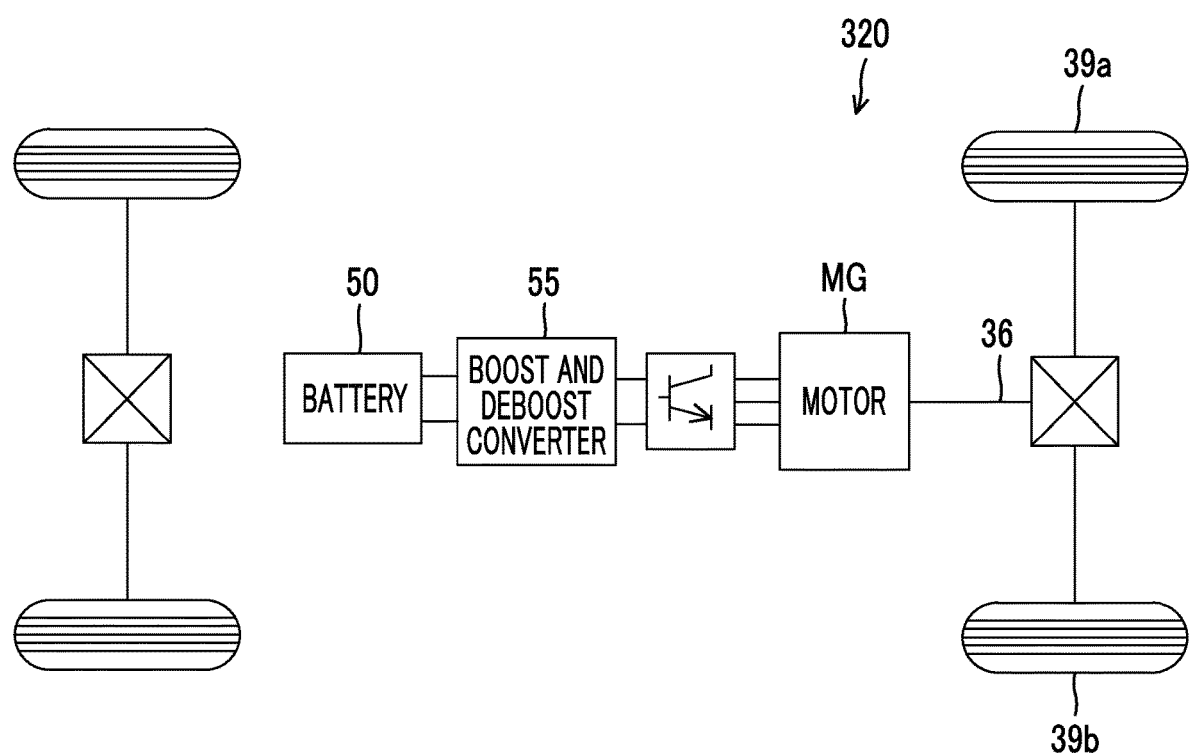
FIG. 15 is a configuration diagram showing the outline of the configuration of an electric vehicle of a modification example.

In the example, the hybrid vehicle 20 has a configuration in which the engine 22 and the motor MG1 are connected to the drive shaft 36 coupled to the drive wheels 39*a*, 39*b* through the planetary gear 30, and the motor MG2 is connected to the drive shaft 36. However, as shown in an electric vehicle 320 of a modification example of FIG. 15, the electric vehicle 320 may have a configuration in which a motor MG for traveling is connected to the drive shaft 36 coupled to the drive wheels 39*a*, 39*b*. In a case of the configuration of the electric vehicle 320, the generation mode setting routine of FIG. 11 is executed, whereby it is possible to promote an increase in temperature of the battery 50.

The disclosure is not limited to such a vehicle, and may be applied to a drive device that is mounted in a moving object, such as a vehicle, or may be applied to a drive device that is embedded in a facility, such as a construction facility, not a moving object.

The correspondence relationship between the primary components of the example and the primary components of the disclosure described in "SUMMARY" will be described. In the example, the motor MG2 corresponds to a "motor", the inverter 42 corresponds to an "inverter", the battery 50 corresponds to an "electric power storage device", and the HVECU 70 and the motor ECU 40 correspond to an "electronic control unit". The motor MG1 corresponds to a "second motor".

The correspondence relationship between the primary components of the example and the primary components of the disclosure described in "SUMMARY" should not be considered to limit the components of the disclosure described in "SUMMARY" since the example is solely illustrative to specifically describe the aspects of the disclosure. That is, the disclosure described in "SUMMARY" should be interpreted based on the description in "SUMMARY", and the example is merely a specific example of the disclosure described in "SUMMARY".

Although the mode for carrying out the disclosure has been described above in connection with the example, the disclosure is not limited to the example, and can be of course carried out in various forms without departing from the spirit and scope of the disclosure.

The disclosure is usable in a manufacturing industry of a drive device and a vehicle, or the like.

What is claimed is:

1. A drive device comprising:
a motor;
an inverter configured to drive the motor by switching of a plurality of switching elements;
an electric power storage device connected to the inverter through an electric power line; and
an electronic control unit configured to generate a pulse width modulation signal of the switching elements based on a modulation factor, a voltage phase of a voltage, and a predetermined pulse number and configured to perform switching of the switching elements, the electronic control unit being configured to generate the pulse width modulation signal of the switching elements such that total loss when a heat conversion request of drive electric power of the motor has been issued becomes greater than total loss when the heat conversion request has not been issued; and the modulation factor and the voltage phase of the voltage being based on a torque command of the motor, the predetermined pulse number being a pulse number per unit cycle of an electric angle of the motor, and the total loss being total loss of the motor and the inverter.

2. The drive device according to claim 1, wherein the electronic control unit is configured to generate the pulse width modulation signal of the switching elements such that the total loss when the heat conversion request has been issued becomes greater than the total loss when the heat conversion request has not been issued in the same pulse number.

3. The drive device according to claim 1, wherein the electronic control unit is configured to generate the pulse width modulation signal of the switching elements such that the total loss when the heat conversion request has been issued becomes greater than the total loss when the heat conversion request has not been issued due to a harmonic component of a desired degree becoming greater.

4. The drive device according to claim 1, further comprising:
a cooling device configured to circulate a coolant to the motor, the inverter, and the electric power storage device,
wherein the electronic control unit is configured to determine that the heat conversion request has been issued when a temperature increase request of the electric power storage device has been issued.

5. The drive device according to claim 1, further comprising:
an engine, and
a cooling device configured to circulate a coolant to the engine, the motor, and the inverter,
wherein the electronic control unit is configured to determine that the heat conversion request has been issued when a warm-up request of the engine has been issued.

6. A vehicle comprising:
a drive device including a first motor, a first inverter, an electric power storage device, and an electronic control unit,
the first inverter being configured to drive the first motor by switching a plurality of first switching elements, and
the electric power storage device being connected to the first inverter through an electric power line;
an engine;
a second motor;
a second inverter connected to the first motor and the electric power storage device through the electric power line, the second inverter being configured to drive the second motor by switching a plurality of second switching elements;
a planetary gear including three rotating elements connected to the second motor, the engine, and a drive shaft that is coupled to drive wheels, the second motor, the engine, and the drive shaft being arranged in this order in a collinear diagram; and
a capacitor attached to the electric power line,
the first motor being connected to the drive shaft,
the electronic control unit being configured to generate a pulse width modulation signal of the first switching elements based on a modulation factor and a voltage phase of a voltage and a predetermined pulse number and perform switching of the first switching elements,
the electronic control unit being configured to generate the pulse width modulation signal of the first switching elements such that first total loss when a first heat conversion request of drive electric power of the first motor has been issued becomes greater than first total loss when the first heat conversion request has not been issued,
the electronic control unit being configured to perform switching of the first switching elements of the first inverter and perform switching of the second switching elements of the second inverter,
the electronic control unit being configured to determine that the first heat conversion request and a second heat conversion request of drive electric power of the second motor have been issued when the drive wheels are gripped after the drive wheels are slipped,
when the electronic control unit determines that the first heat conversion request and the second heat conversion request have been issued, the electronic control unit being configured to generate the pulse width modulation signal of the first switching elements and perform switching of the first switching elements such that the first total loss when the electronic control unit determines that the first heat conversion request and the second heat conversion request have been issued becomes greater than the first total loss when the electronic control unit determines that the first heat conversion request and the second heat conversion request have not been issued, and configured to generate a pulse width modulation signal of the second switching elements and perform switching of the second switching elements such that second total loss when the electronic control unit determines that the first heat conversion request and the second heat conversion request have been issued becomes greater than the second total loss when the electronic control unit determines that the first heat conversion request and the second heat conversion request have not been issued, and
the modulation factor and the voltage phase of the voltage being based on a torque command of the first motor, the predetermined pulse number being a pulse number per unit cycle of an electric angle of the first motor, the first total loss being total loss of the first motor and the first inverter, and the second total loss being total loss of the second motor and the second inverter.

7. A vehicle comprising:
a drive device including a first motor, a first inverter, an electric power storage device, and an electronic control unit,
the first inverter being configured to drive the first motor by switching a plurality of first switching elements, and
the electric power storage device being connected to the first inverter through an electric power line;
an engine;
a second motor;
a second inverter connected to the first motor and the electric power storage device through the electric power line, the second inverter being configured to drive the second motor by switching a plurality of second switching elements; and a planetary gear including three rotating elements connected to the second motor, the engine, and a drive shaft that is coupled to drive wheels, the second motor, the engine, and the drive shaft being arranged in this order in a collinear diagram;

the first motor being connected to the drive shaft, the electronic control unit being configured to generate a pulse width modulation signal of the first switching elements based on a modulation factor and a voltage phase of a voltage and a predetermined pulse number and perform switching of the first switching elements, the electronic control unit being configured to generate the pulse width modulation signal of the first switching elements such that total loss when a heat conversion request of drive electric power of the first motor has been issued becomes greater than total loss when the heat conversion request has not been issued, the electronic control unit being configured to perform switching of the first switching elements of the first inverter and perform switching of the second switching elements of the second inverter, the electronic control unit being configured to determine that the heat conversion request has been issued when an output of braking torque to the drive shaft is requested on a downhill road, the electronic control unit is configured to execute regenerative drive of the first motor by generating the pulse width modulation signal of the first switching elements and performing switching of the first switching elements such that the total loss when the electronic control unit determines that the heat conversion request has been issued becomes greater than the total loss when the electronic control unit determines that the heat conversion request has not been issued, and the modulation factor and the voltage phase of the voltage being based on a torque command of the first motor, the predetermined pulse number being a pulse number per unit cycle of an electric angle of the first motor, and the total loss being total loss of the first motor and the first inverter.

8. A control method for a drive device, the drive device includes a motor, an inverter, an electric power storage device, and an electronic control unit, the inverter is configured to drive the motor by switching a plurality of switching elements, the electric power storage device is connected to the inverter through an electric power line, the control method comprising:

generating, the electronic control unit, a pulse width modulation signal of the switching elements based on a modulation factor and a voltage phase of a voltage and a predetermined pulse number and performing switching of the switching elements; and generating, the electronic control unit, the pulse width modulation signal of the switching elements with the electronic control unit such that total loss when a heat conversion request of drive electric power of the motor has been issued becomes greater than total loss when the heat conversion request has not been issued, the modulation factor and the voltage phase of the voltage being based on a torque command of the motor, the predetermined pulse number being a pulse number per unit cycle of an electric angle of the motor, and the total loss being total loss of the motor and the inverter.

* * * * *